April 30, 1935.  W. F. NEWHOUSE  1,999,821
MACHINE FOR MAKING BARRELS
Filed Feb. 3, 1933   15 Sheets-Sheet 1

Inventor:
Walter F. Newhouse
By Arthur F. Durand
Atty.

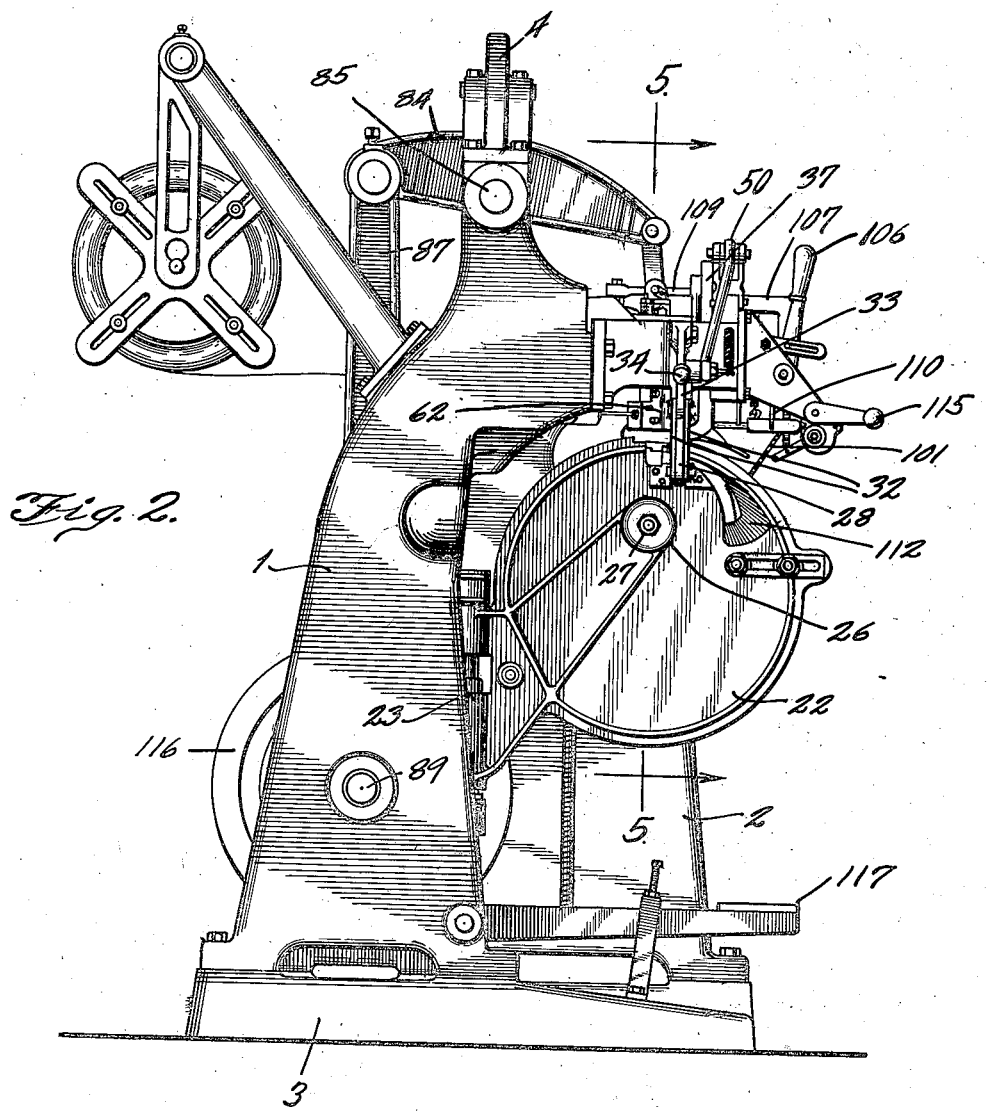

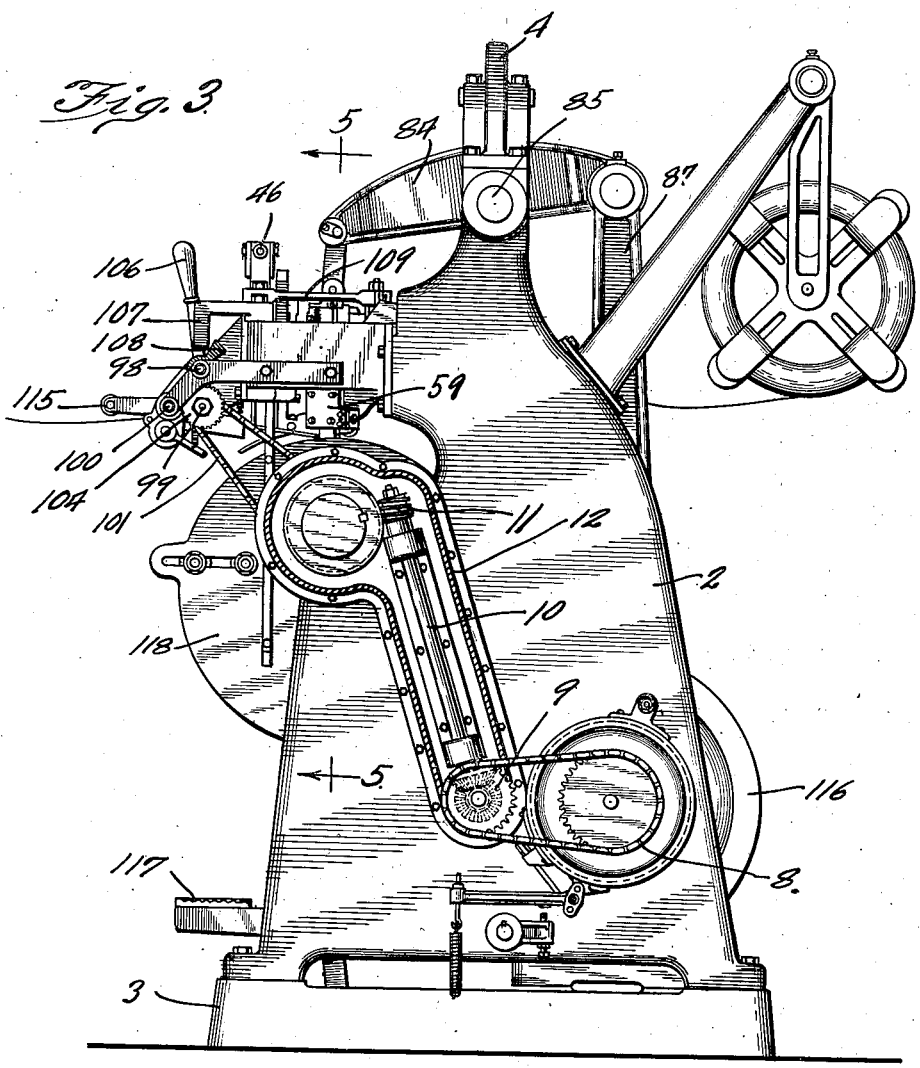

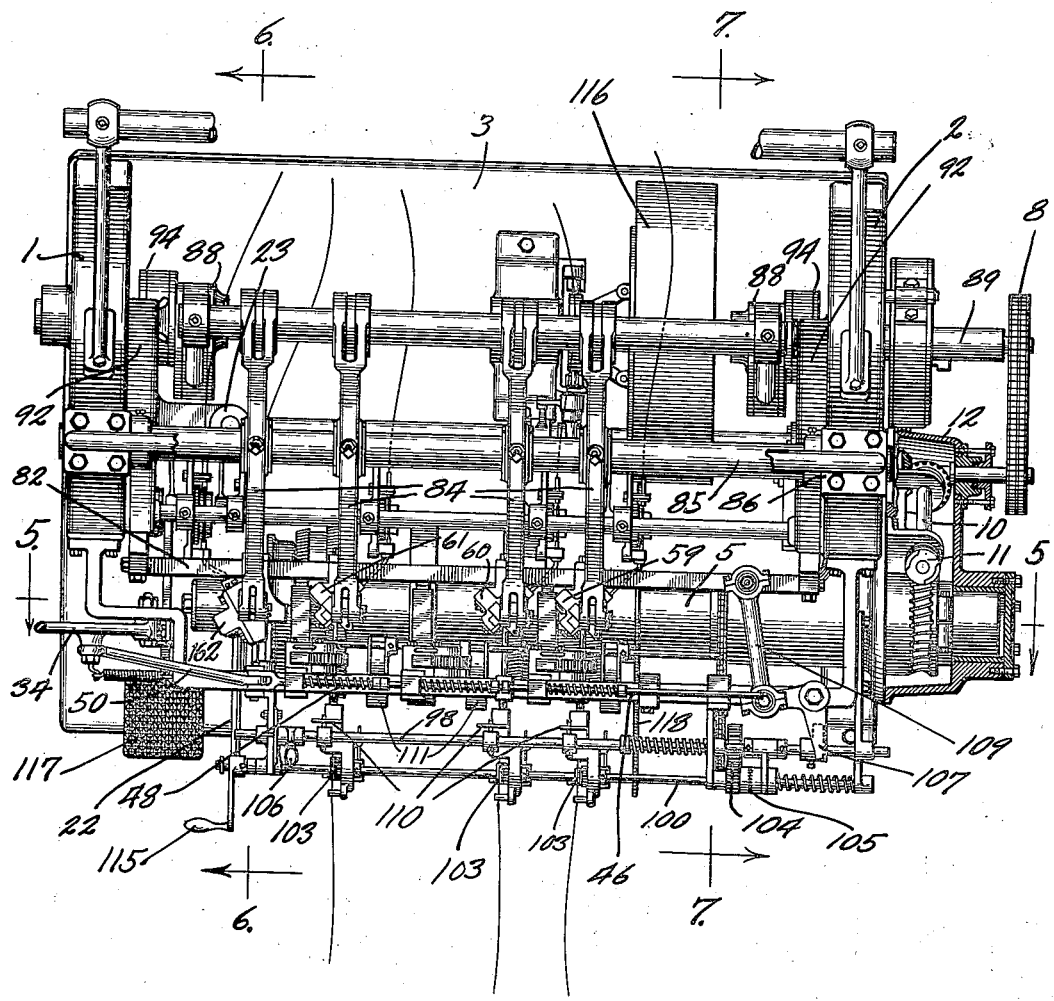

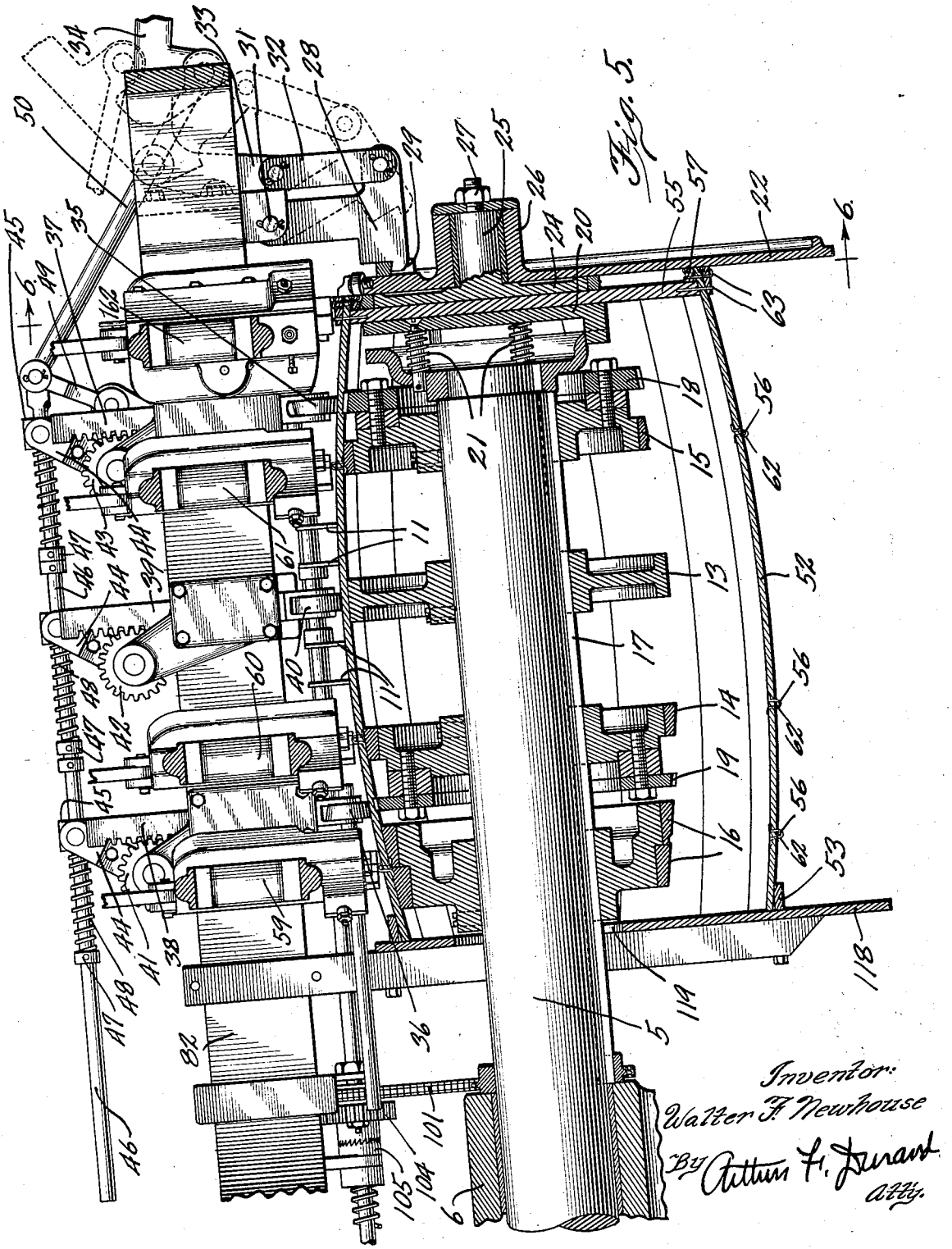

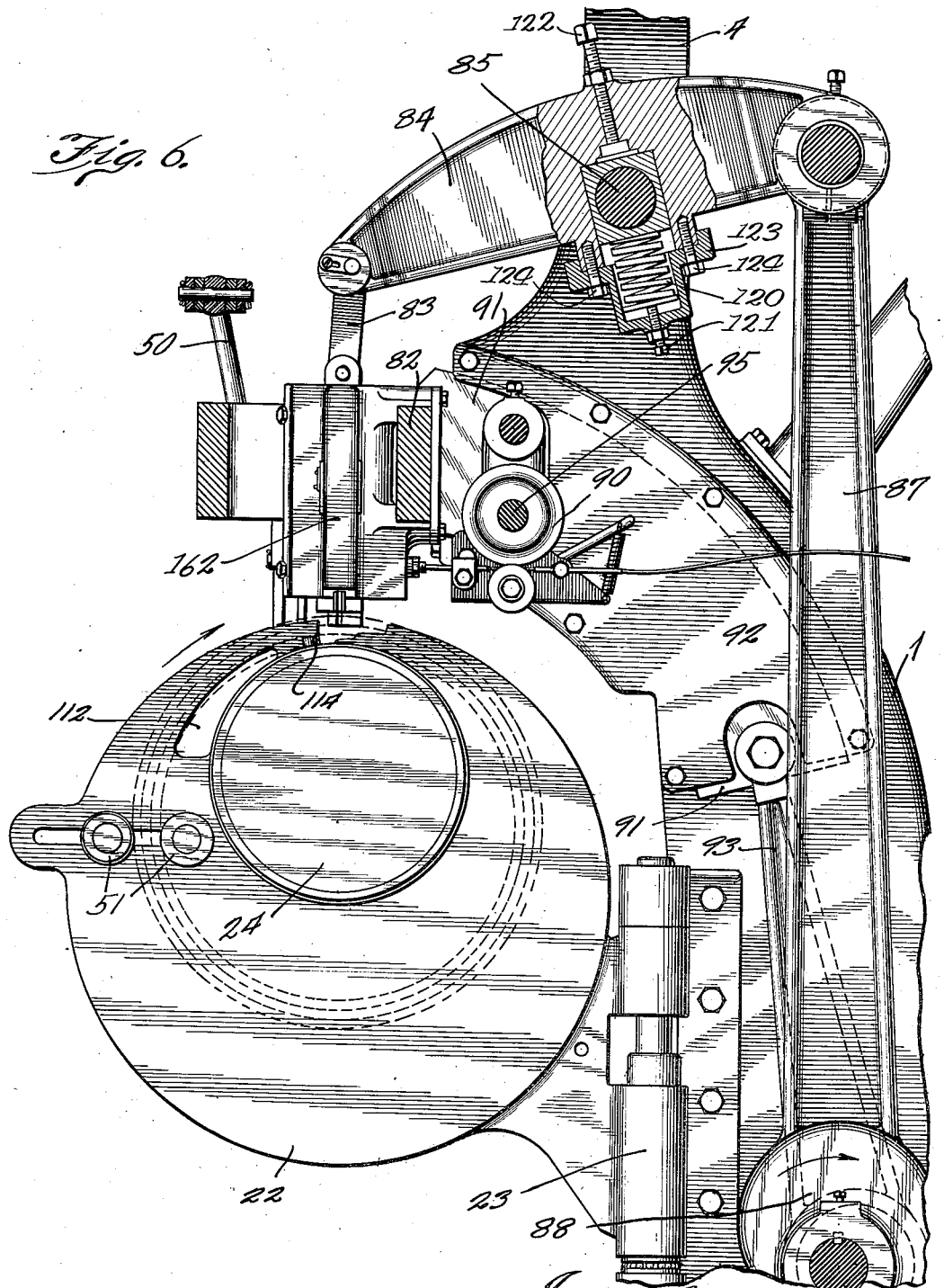

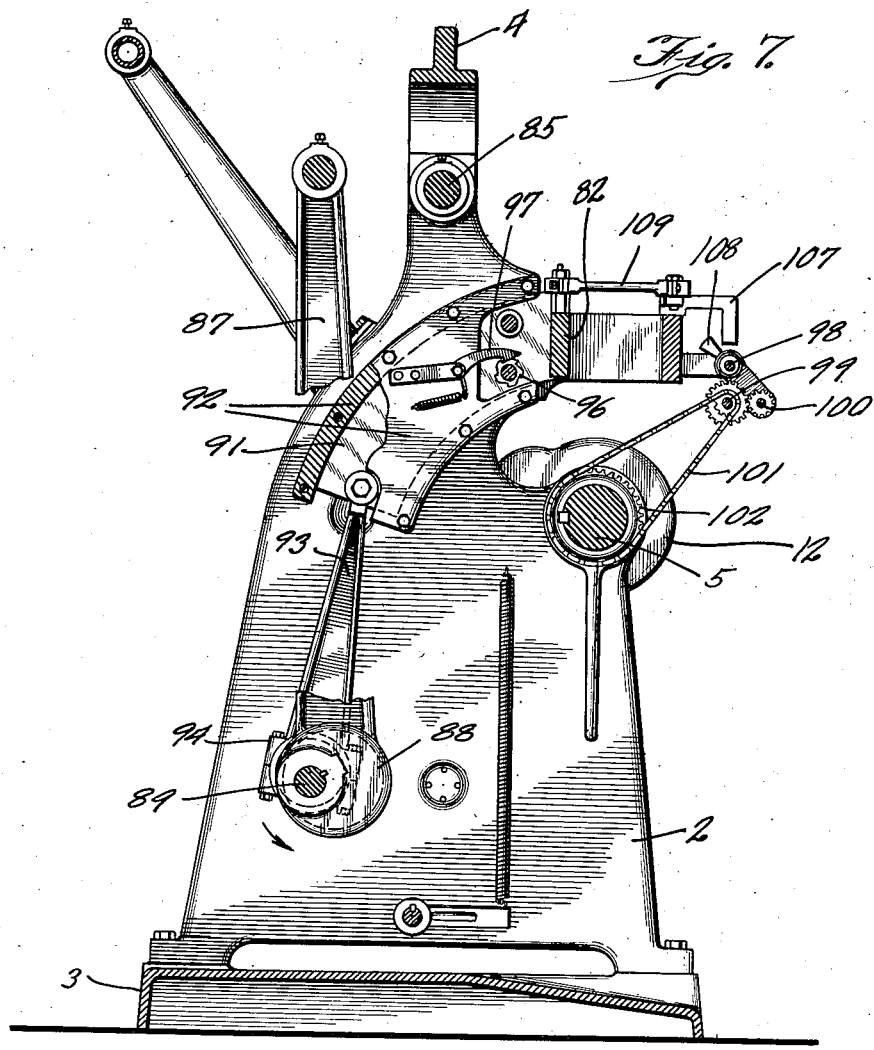

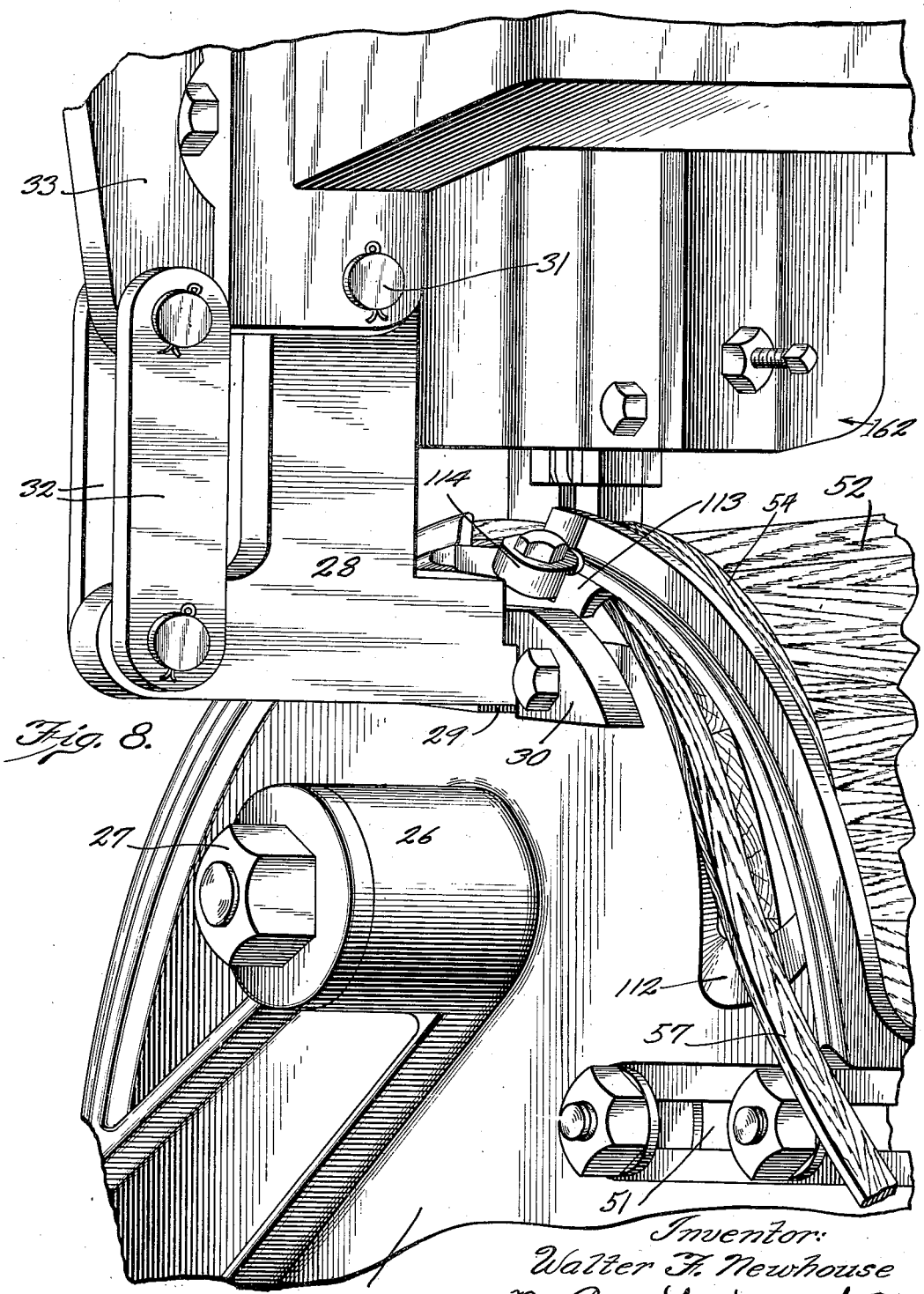

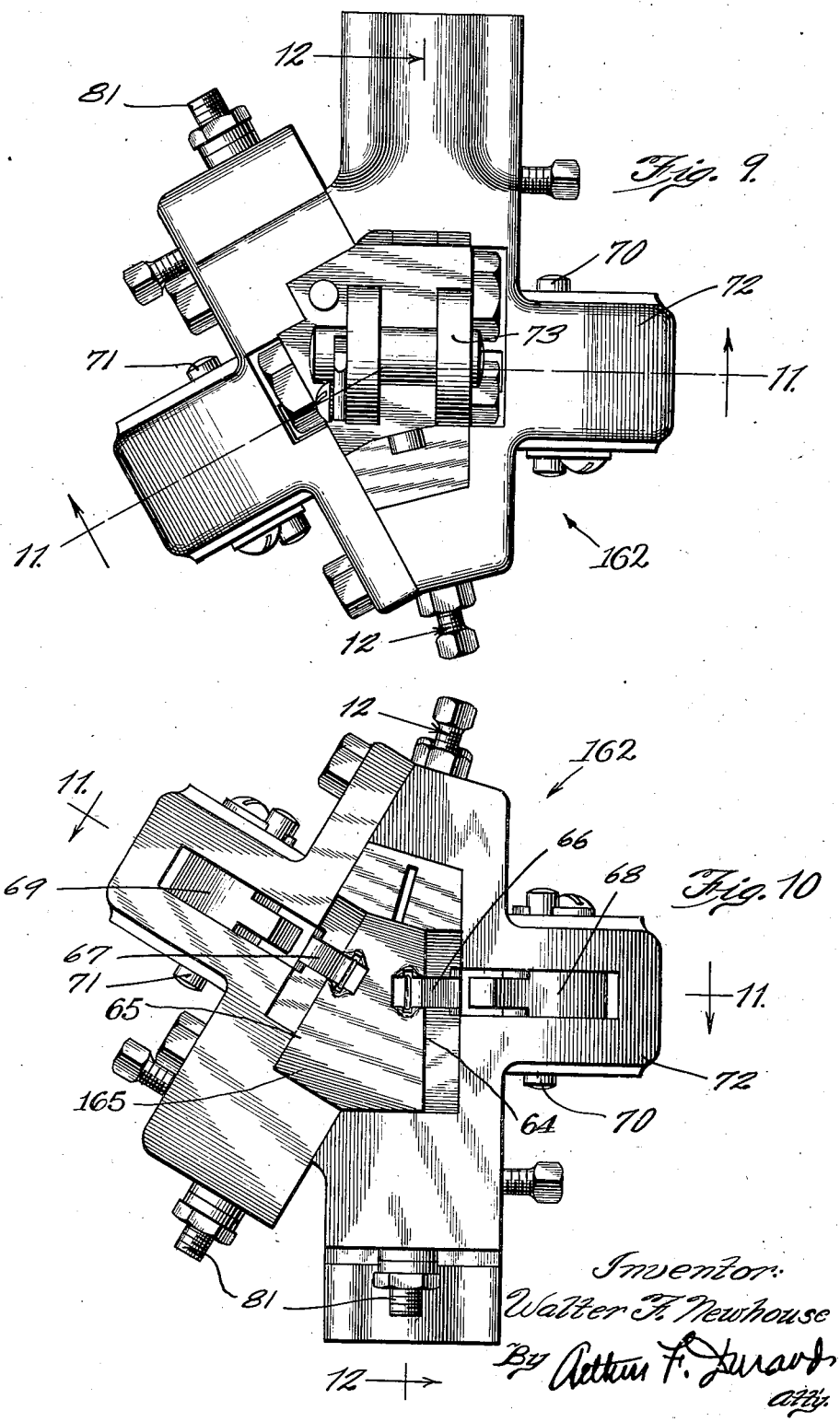

April 30, 1935.  W. F. NEWHOUSE  1,999,821
MACHINE FOR MAKING BARRELS
Filed Feb. 3, 1933  15 Sheets-Sheet 10
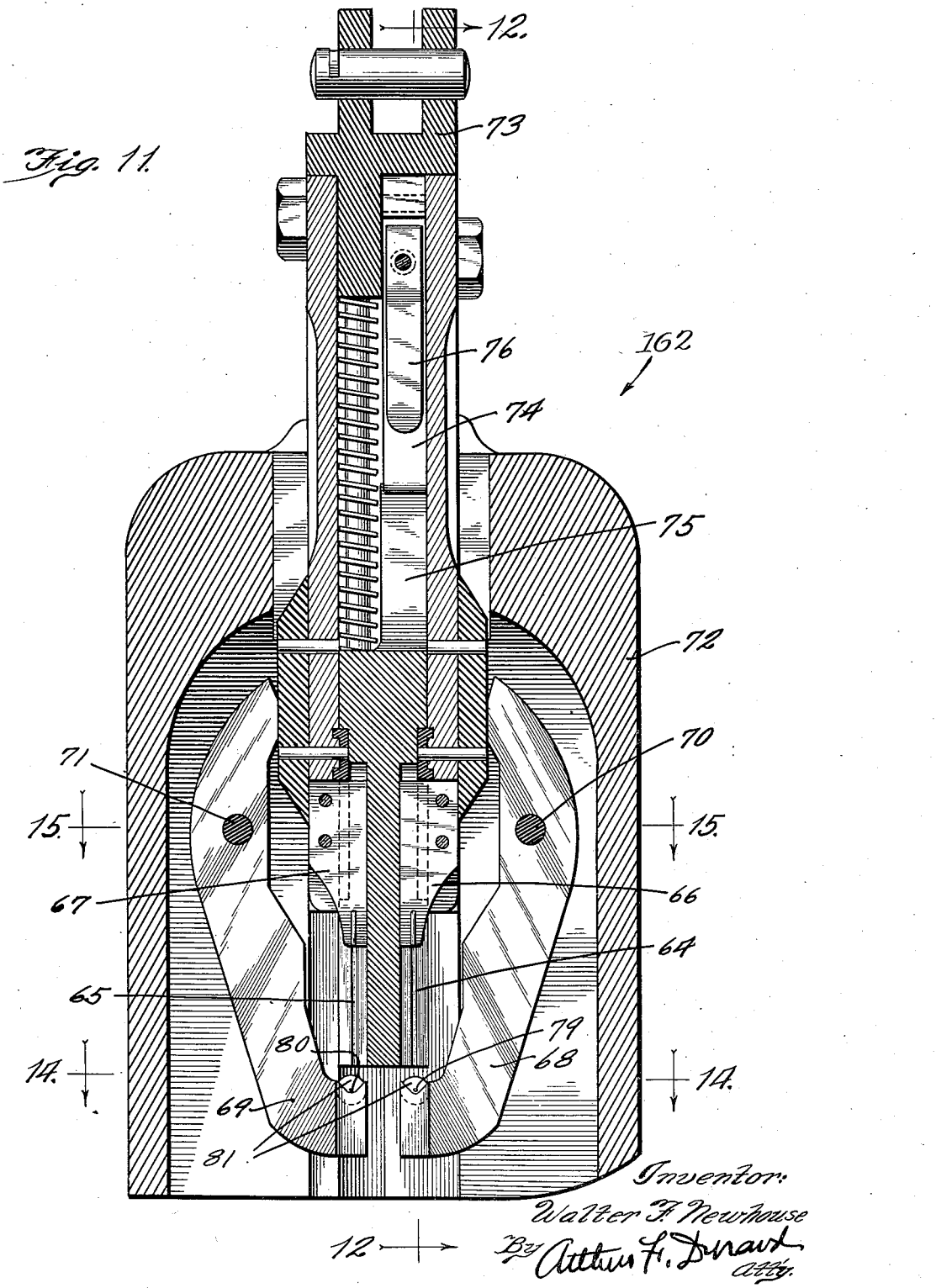

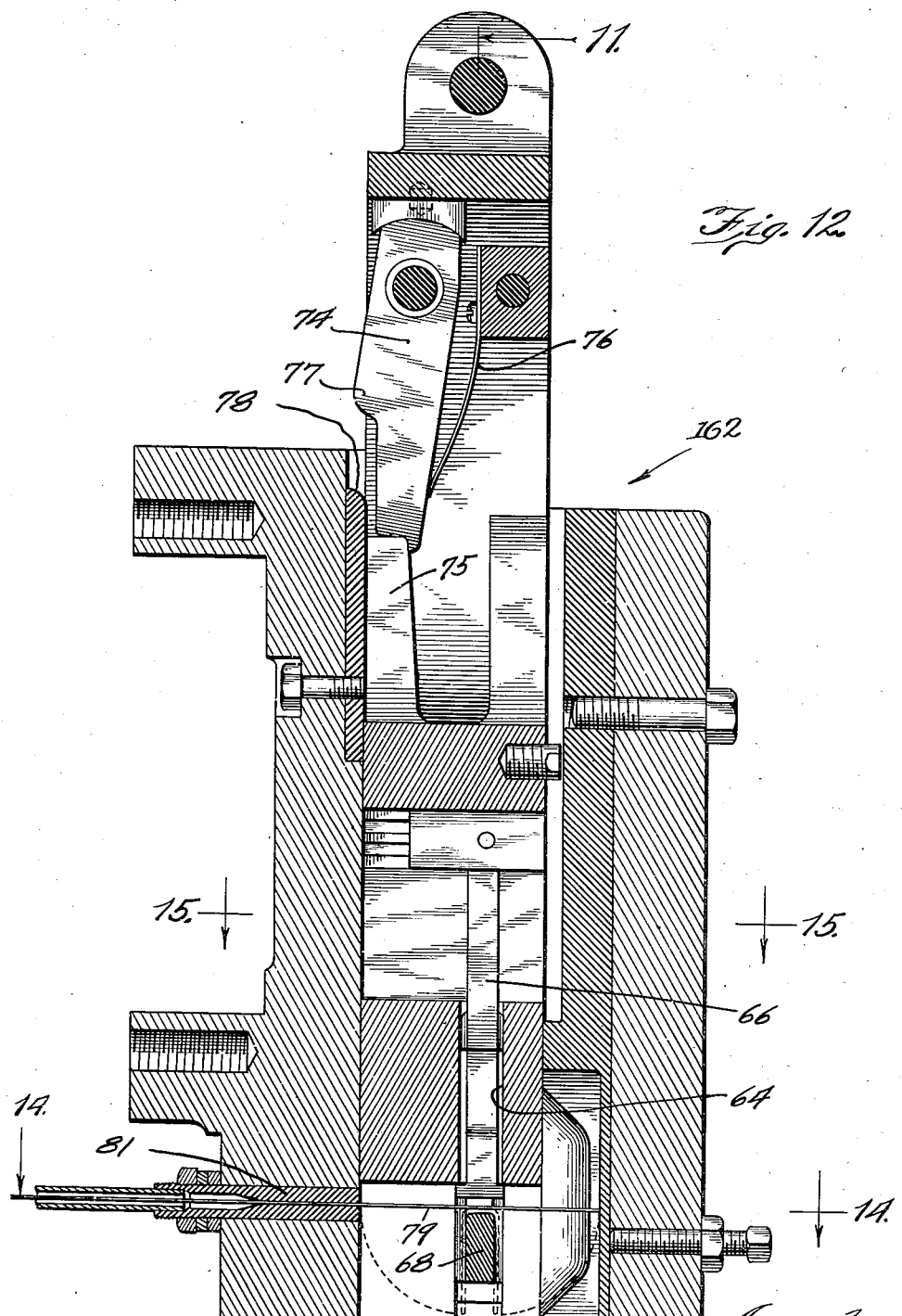

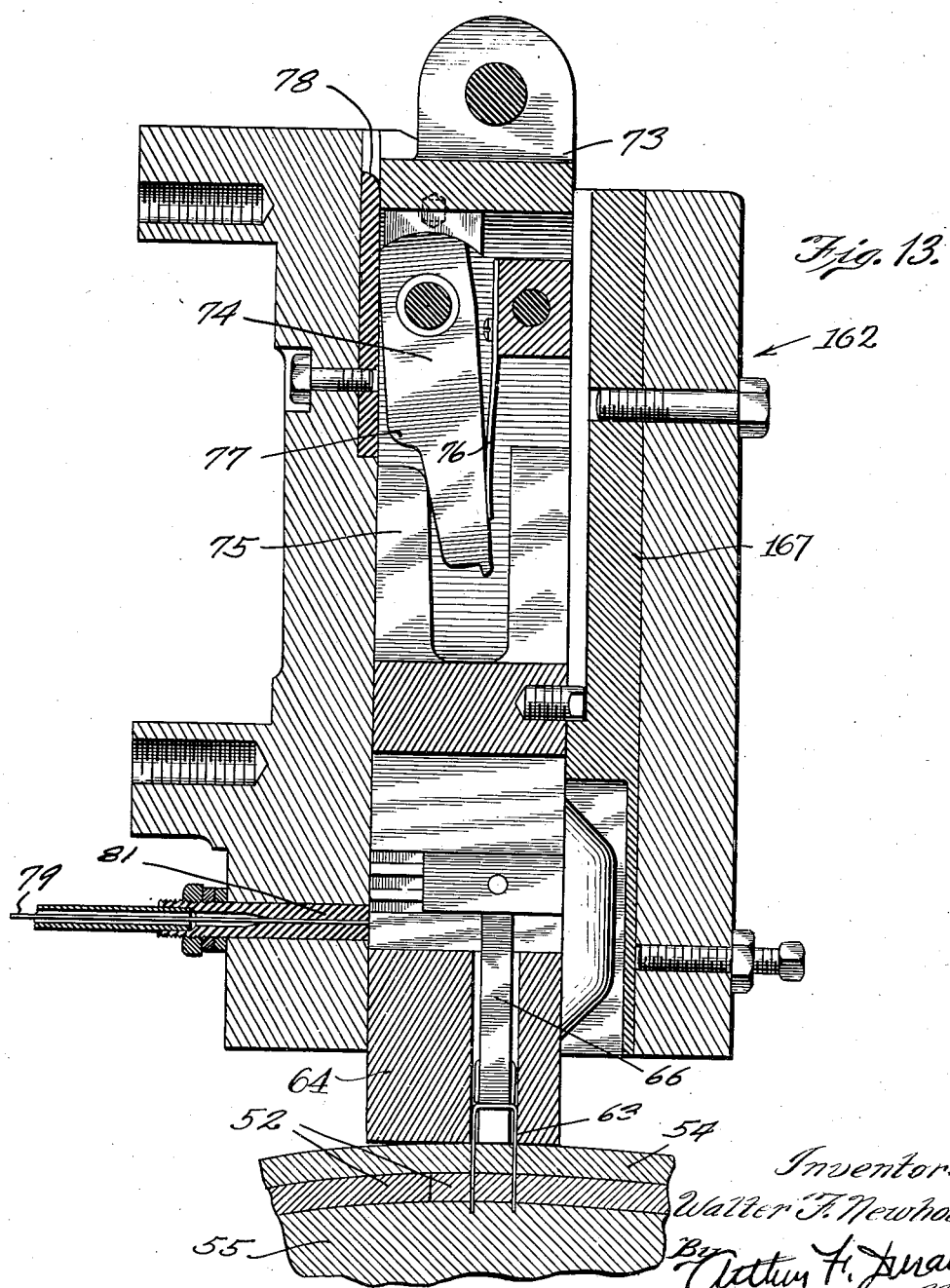

April 30, 1935.   W. F. NEWHOUSE   1,999,821
MACHINE FOR MAKING BARRELS
Filed Feb. 3, 1933    15 Sheets-Sheet 13
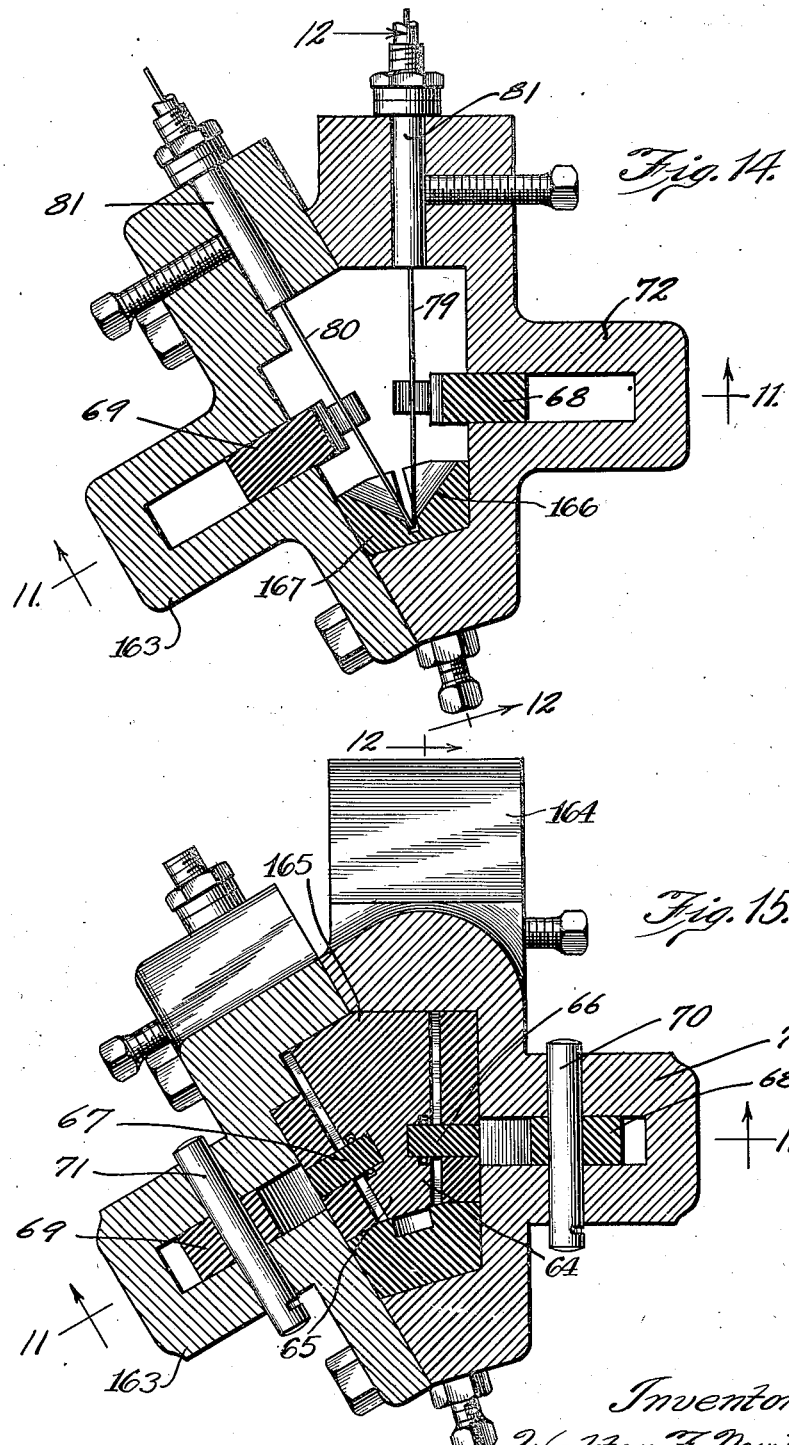

April 30, 1935.  W. F. NEWHOUSE  1,999,821
MACHINE FOR MAKING BARRELS
Filed Feb. 3, 1933   15 Sheets-Sheet 14

April 30, 1935. W. F. NEWHOUSE 1,999,821
MACHINE FOR MAKING BARRELS
Filed Feb. 3, 1933 15 Sheets-Sheet 15

Inventor
Walter F. Newhouse
By Arthur H. Durand
Atty.

Patented Apr. 30, 1935

1,999,821

UNITED STATES PATENT OFFICE 1,999,821

MACHINE FOR MAKING BARRELS

Walter F. Newhouse, Benton Harbor, Mich.

Application February 3, 1933, Serial No. 655,056

79 Claims. (Cl. 1—13.6)

This invention relates to machinery for making barrels, or similar containers, and more especially to machines for hooping a so-called barrel set-up.

Generally stated, the object of the invention is to provide a novel and improved construction for rotating the barrel or other container continuously, during the hooping operation, and during the operation of fastening one head in the barrel, thereby to obviate the necessity of using an intermittent feeding motion for the rotation of the barrel, to speed up the work and render the operation of the machine more satisfactory in various ways, and to obtain certain advantages which are not possible with the intermittent style of feed.

It is also an object to provide a novel and improved construction for moving the stapler heads a distance with the rotating barrel or other container, whereby the barrel or container and the stapling mechanism will move in unison during the actual insertion of the staples by which the hoops are secured in place, thereby to obviate any distortion or imperfect insertion of the staples.

It is also an object to provide certain details and features of construction and combinations tending to increase the general efficiency and the desirability of a barrel or other container machine of this particular character.

To the foregoing and other useful ends the invention consists in matters hereinafter set forth and claimed and shown in the accompanying drawings, in which—

Fig. 2 is an end elevation of the said machine.

Fig. 3 is a similar view of the other end of the machine.

Fig. 4 is a plan view of said machine.

Fig. 5 is a section on line 5—5 in Figs. 2, 3, and 4.

Fig. 6 is a section on line 6—6 in Figs. 1, 4, and 5.

Fig. 7 is a section on line 7—7 in Figs. 1 and 4.

Fig. 8 is a detail perspective showing certain portions of the front of the machine, and illustrating the method of feeding an inside end hoop into the barrel.

Fig. 9 is a plan view of the double stapling mechanism employed for securing the outside bottom hoop in place, and for stapling the barrel head in place.

Fig. 10 is a bottom plan of said stapling mechanism.

Fig. 11 is a section on line 11—11 in Figs. 9, 10, 14, and 15.

Fig. 12 is a section on line 12—12 in Figs. 9, 10, 11, 14, and 15.

Fig. 13 is a similar view with certain parts thereof in different positions.

Fig. 14 is a horizontal section on line 14—14 in Figs. 11 and 12.

Fig. 15 is a similar section on line 15—15 in Figs. 11 and 12.

Figure 1:
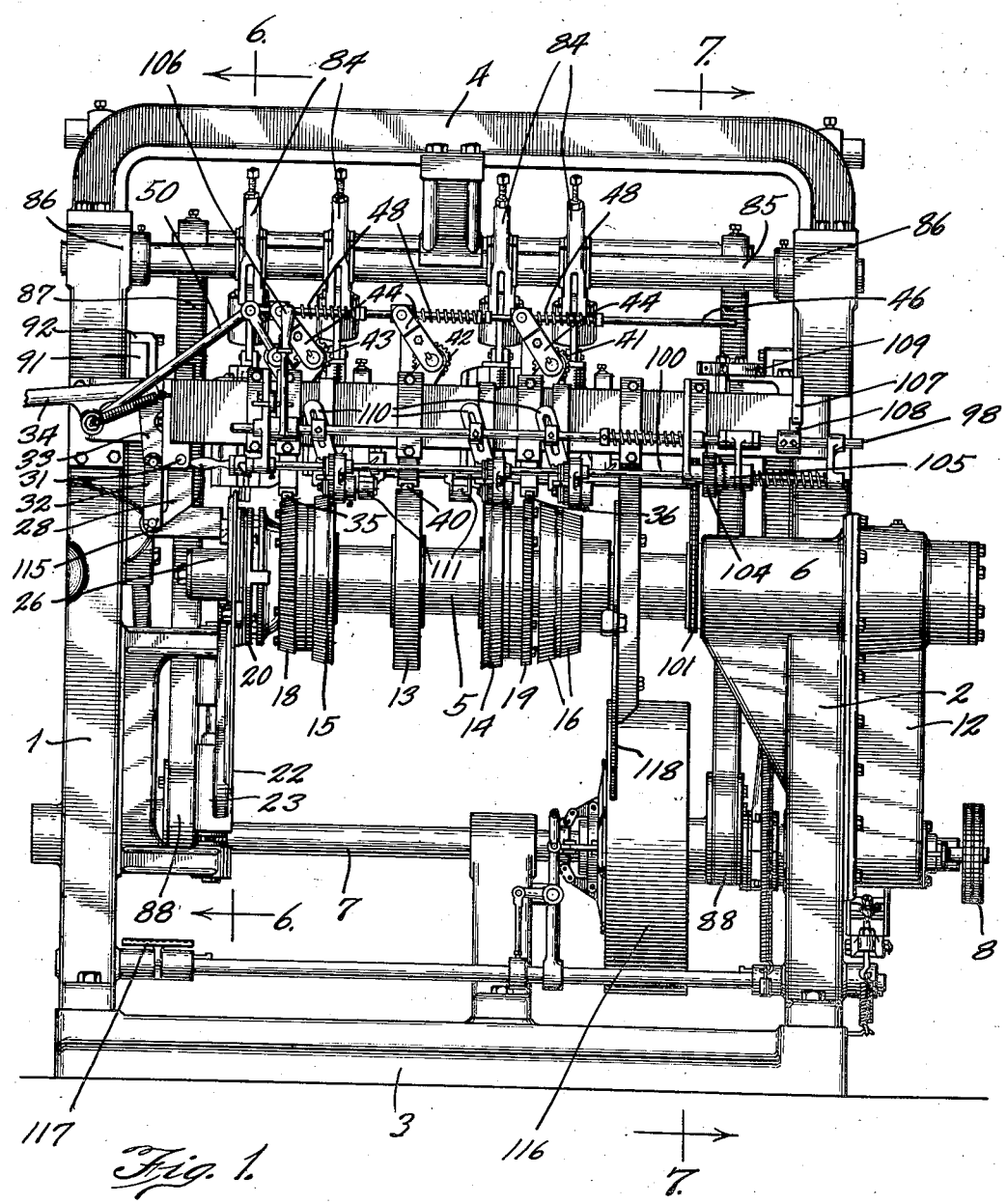
Fig. 1 is a front elevation of a machine embodying the principles of the invention.
Figure 16:
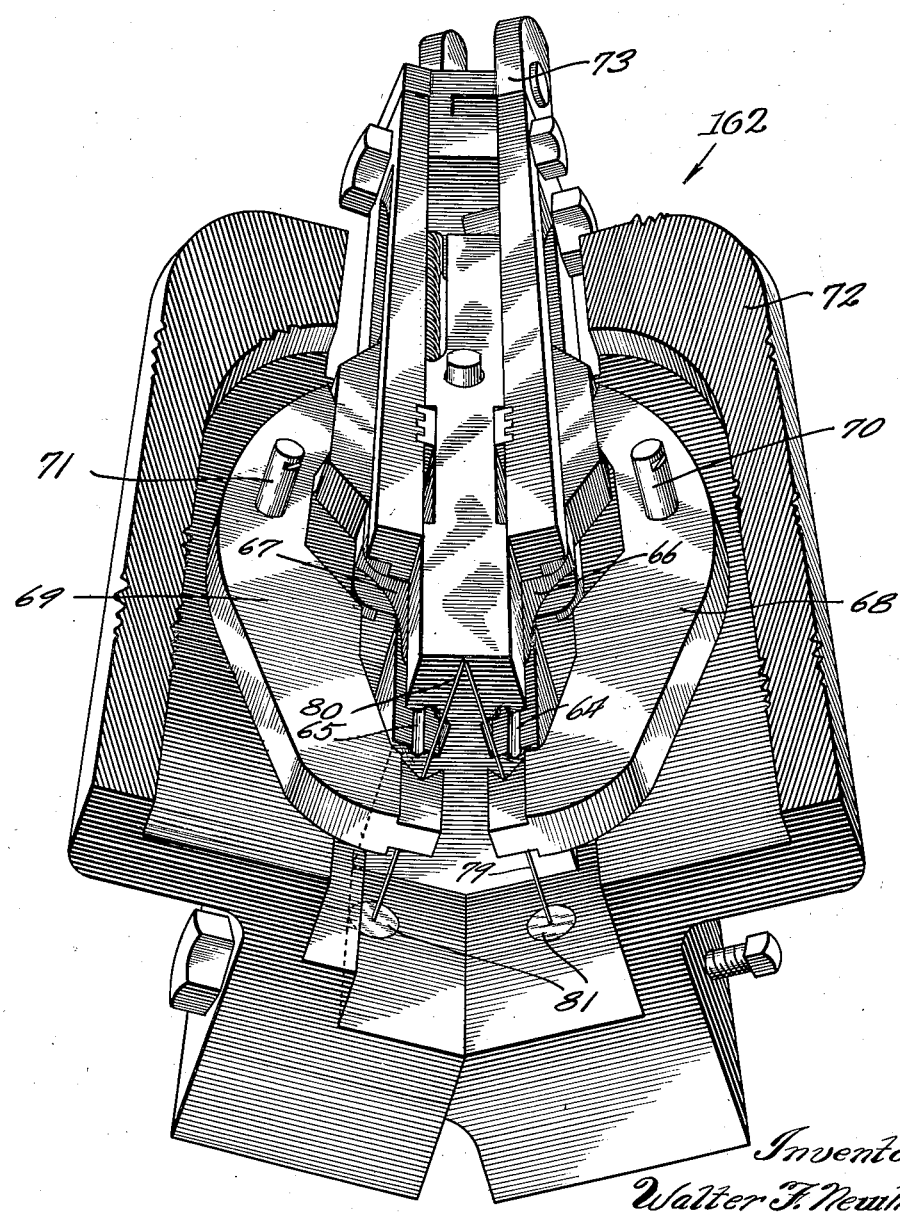
Fig. 16 is a perspective of the double stapler head with certain outer portions thereof shown broken away or omitted for convenience of illustration.

As thus illustrated, the invention comprises a body frame having front and rear end members 1 and 2, connected at their lower ends by a base member 3, and at their tops by an arch or span 4, whereby a rigid body frame is provided for supporting the various operative parts.

The instrumentalities for supporting and rotating the barrel include a horizontal shaft 5 at the front of the machine, said shaft supported in a bearing 6, and being driven from the main drive shaft 7 through the medium of a sprocket chain connection 8, bevel gearing 9, the more or less upright shaft 10, and the worm gearing 11, on the said shaft 5, whereby the latter is given a continuous rotation, for feeding the barrel by a continuous rotary motion, instead of by the ordinary intermittent feeding motion. A housing 12 is provided for enclosing the bevel gearing 9, the shaft 10, and the worm gearing 11, as shown in Fig. 3 of the drawings.

The annular barrel supports 13, 14, 15, and 16 are splined on the shaft 5, by the spline or feather 17, so that these barrel supports may be adjusted toward and away from each other to accommodate barrels of different sizes. A toothed wheel 18 is removably bolted to the support 15, and a similar toothed wheel 19 is removably bolted to the support 14, these wheels having teeth for engaging the inner surface of the barrels, thereby to rotate each barrel about its own axis, which axis is below and parallel with the axis of the shaft 5. As will be seen, this method provides clearance between the under sides of the barrel supports and the under side of the barrel, so that only the upper side of the barrel is in engagement with the barrel supporting and feeding instrumentalities. Thus the barrel supporting means will accommodate barrels of different sizes.

In order to hold the barrel in place, with its bottom head against the cushion plate 20, the latter being backed by springs 21, a door or cover plate 22 is hinged on the body frame at 23 and provided on its inner side with a rotary staple clinching plate 24, the periphery of which latter is provided with means for clinching the points of the staples that are inserted through the bottom hoop. This plate 24 has a stem 25 rotatably supported in the bearing 26 which is formed integrally with the plate 22, with a nut 27, to hold the stub-like shaft 25 against endwise displacement. It will be seen that the axis of the stub shaft 25 is co-incident with the axis of the shaft 5, and the staples at this end of the barrel are clinched at the upper edge of the plate 24 as the latter rotates with its upper edge in engagement with the upper wall of the barrel, but with its lower edge some distance above the lower side of the barrel. In other words, the plate 24 rotates in unison with the barrel supports. The door plate 22 is controlled by a locking element 28, which engages a notch 29 in said plate, or in the bracket piece 30 secured to the door or plate, said element being pivotally supported at its upper end at 31 and having a link connection 32 with the arm 33 of the hand lever 34, whereby the door or plate 22 may be manually locked or unlocked.

In the feeding of the barrel by means of the toothed wheels 18 and 19, it will be seen that the presser rollers 35 and 36 bear against the upper side of the barrel, directly over the wheels 18 and 19, thereby to keep the barrel staves in firm engagement with these wheels, to prevent slippage in the feeding motion. The rollers 35 and 36 are mounted on the lower ends of racks 37 and 38, and there is a similar rack 39 for the roller 40, which is disposed in position to bear upon the barrel directly over the middle barrel support 13 previously mentioned. The principal object or purpose of the rollers 35, 36, and 40 is to give the barrels a uniform and definite shape, and it will be understood that the racks upon which these rollers are mounted are carried in suitable bearings mounted on the body frame of the machine. Looking at Fig. 5, it will be seen that the axes of the rollers 35 and 36 are coincident, while the axis of the roller 40 is a little above, but these rollers all have axes fixed against lateral displacement, about which they revolve. Pinions 41, 42, and 43 engage the said racks, these pinions being mounted in bearings suitably supported by the body frame of the machine. The said pinions each have an arm 44 provided with a collar 45 that is adapted to slide on the horizontal rod or support 46, said rod being provided with fixed collars 47, and with springs 48 between said collars and the sliding collars 45, and the end of the rod 46 is supported by a pivot link 49 and connected by a longer link 50 with the previously mentioned hand lever 34, and with this arrangement the motion of the hand lever 34 upwardly will not only release the locking element 38, thereby to unlock the door 22, but will also ease up on the rollers 35, 36, and 40, thereby to release their grip on the barrel, so that the barrel may then be removed from the front end of the supporting structure upon which the barrel is supported while being rotated.

Preferably the inside of the plate or door forming in effect a gate 22 is provided with two rollers 51 which engage the inner and outer surfaces of the rim of the barrel, just outside the head of the barrel, and which form a guide therefor, as shown in Fig. 6 of the drawings, whereby the rotation of the barrel is maintained about a fixed axis.

Figure 17:
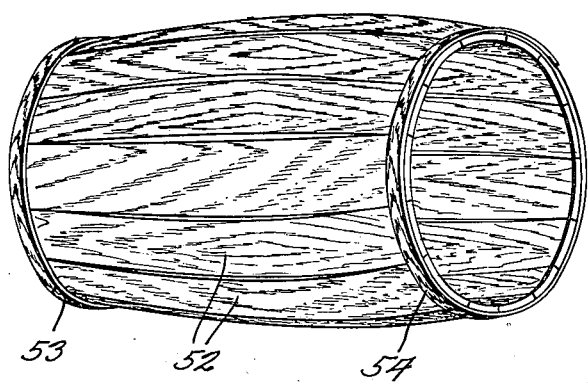
Fig. 17 is a perspective of the barrel set-up before it is placed in the machine.
Figure 18:
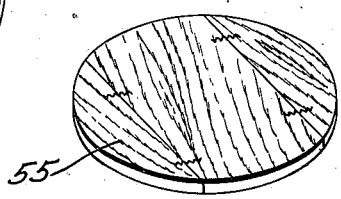
Fig. 18 is a perspective of the bottom head of the barrel.
Figure 19:
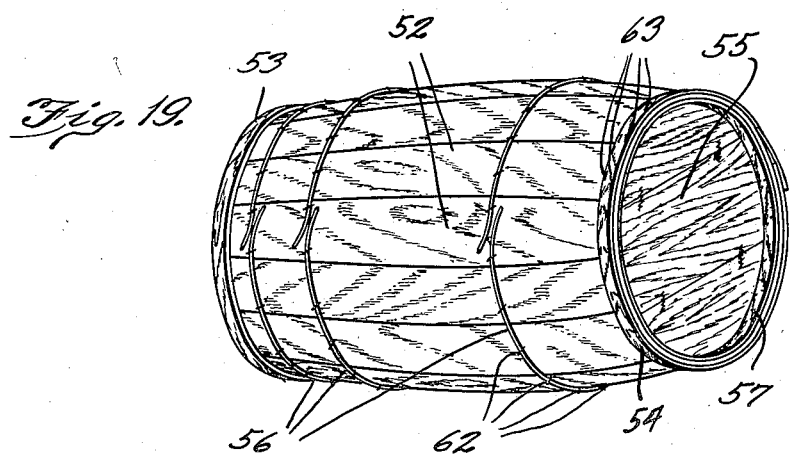
Fig. 19 is a perspective of the completed barrel in one form thereof.
Figure 20:
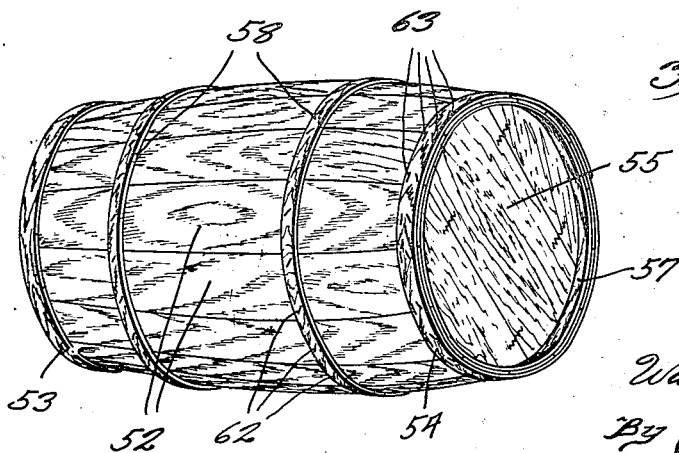
Fig. 20 is a similar view showing the completed barrel in a different form.

Fig. 17 shows the so-called barrel set-up that is made in another machine, and then placed in the stapling machine to have the hoops secured in place. This barrel set-up comprises the staves 52 held in barrel form by the outside wood hoops 53 and 54 at the ends thereof. The bottom head 55 is placed in the barrel and is secured in place by the stapling machine. This is done at the time that the wire hoops 56 are stapled in place, and at the same time that the inside bottom hoop or liner 57 is stapled in place. Or instead of the wire hoops the barrel may have the ordinary wooden hoops 58 as shown in Fig. 20 of the drawings. The three staplers 59, 60, and 61 drive the staples 62 that secure either the wire or the wood hoops in place, and are of ordinary or any suitable construction. However, it will be seen that the bottom hoop 54 is secured in place by pairs of staples 63, the members of each pair being driven at an angle to each other, and for this purpose a special stapling mechanism is employed.

The double stapler head 162 is shown in Figs. 9 to 16 inclusive, involves a single casing for all of the elements thereof, so that it may be mounted and operated like a single head, and is constructed as follows: Looking at Fig. 11, and the other said figures of the drawings, it will be seen that there are two staple formers 64 and 65, and two staple drivers 66 and 67, and two angles or loop bars 68 and 69, said loop bars being pivoted at 70 and 71 on the housing 72 of the stapling mechanism. The two staple drivers are rigidly connected to the head block 73, but each staple former has a sliding connection with the staple driver, there being a locking dog 74 pivoted on the staple driver, and normally the lower end of this dog engages the upper end portions 75 of the staple formers. Springs 76 are provided to yieldingly hold the dogs 74 in locking engagement with their respective staple formers. Each locking dog has a cam portion 77 for engagement with a stationary cam 78, when the staple drivers and the two formers move downward in unison, thereby to unlock the staple formers at the moment when their lower ends engage the barrel, whereby the two staple drivers then move down in unison alone, thereby to insert the staples which have been formed over the lower ends of the loop bars 68 and 69, from cut-off pieces of wire, the staples sliding downwardly in the two staple formers, which latter serve as guides for the insertion of the staples. In this way the duplicate former and driver and loop bars, etc., are all in a single casing, as stated. Fig. 10 shows the lower end of this stapling mechanism, and shows the angles at which the two staples are driven, relative to each other, whereby one staple of each pair is inserted through the outside bottom hoop and through the inside hoop 57 and clinched on the edge of the plate 29, while the other staple of each pair is driven through the outside bottom hoop 54 and into the edge of the head or end-wall 55 of the barrel. Fig. 14 shows the angles at which the wires 79 and 80 are fed to the stapling mechanism, over the lower end portions of the two loop bars, and Figs.

12 and 13 show how the feed tubes 81, through which the wires are fed, co-operate at their ends with the lower ends of the staple formers to cut off a length of wire, reaching across the face of the lower end of each staple former, thereby to bend this cut-off portion of the wire over the loop bar allotted to each staple former, thus forming two staples which are then driven in unison by the action of the two staple drivers 66 and 67 in the manner explained. It will be seen that the arrangement of the two staple drivers and the two staple formers and the two loop bars and the other parts, is compact and efficient, and with this mechanism the staples are driven in successive pairs through the bottom hoop of the barrel, in the manner explained. As shown in Fig. 5, one staple of each pair is driven obliquely in the inside end hoop 57, and the other is driven in the end wall 55, so the staple heads in one row are oblique, and are straight in line in the other row.

It will be seen that the staplers are all mounted on a bar 82—that is to say, the housings of the staplers are bolted or otherwise fastened to this bar, and the head block of each stapler, similar to the head block 73, shown in Fig. 11, is connected by a link 83 with the walking beam or rocker arm 84, which latter is pivoted on the horizontal shaft 85 held in the supports 86 on the body frame. Each rocker arm 84 is connected by a pitman 87 with an eccentric 88 on the shaft 7, which latter is suitably supported by the body frame. In this way the staplers are operated simultaneously from the shaft 7, through the connections shown and described.

Any suitable means may be employed for feeding the staple wire to the staplers. As shown in the drawings, this is done by means of feed rolls 90 of any suitable character, but in the present instance these feed rolls are actuated by special or novel means, as will hereinafter more fully appear.

The bar 82 upon which all of the stapler heads are mounted is in turn supported on curved bracket plates 91, which slide in guides 92 on the body frame. These bracket plates 91 are curved about the axis of the barrel, approximately, and these bracket plates are connected by a pitman 93 with the eccentrics 94 on the shaft 7 previously mentioned. By this means, the stapler heads are all moved in unison, about the axis of the barrel, and the elements are so timed that the stapler heads move at the time that the staples are actually inserted, whereby the barrel and the stapler heads are actually moving in unison, about the axis of the barrel, while the staples are being inserted in the barrel materials. It will be seen that the shaft 95 of the said feed rolls 90 is carried on the two plates 91, and that this shaft has a ratchet wheel 96 for engagement with the ratchet dog 97, which latter is suitably pivoted on the housing of the guides 92, whereby the wire for the staples is fed forward each time that the plates 91 move upwardly. In this way the wire is fed during the back stroke of the staplers, so to speak, as the staple formers and drivers are rising after the insertion of the previous staples.

Means are provided for feeding the wire hoops 56 as follows: The front side of the machine is provided with three shafts 98, 99, and 100, the shaft 99 being driven by a sprocket chain 101 extending to a sprocket 102 on the shaft 5 of the barrel support. Feed rolls 103 are provided on the shaft 100 of a well-known form, to engage the wires from which the hoops are made, and this shaft 100 is driven by said sprocket chain 101 through the medium of the gears 104 and the clutch 105. The shaft 98 is rotatable by means of a handle 106, and is also endwise movable by the bell crank 107 when the latter strikes the projection 108 on the shaft 98, which occurs when the handle 106 is used to rock the shaft in a manner to bring the projection 108 into the path of the bell crank 107, which latter is operated by the link 109 pivoted on the bar 82, whereby movement of the latter operates the said bell crank to shift the shaft 98 endwise. When this occurs, the cutters 110, of a well-known form, are operated to cut the wires, the barrel having been completed, and in addition the clutch 105 is opened, thus automatically stopping the feeding of the wires for the hoops. The said wire feeding and cutting mechanism is old and well-known, but in this case the wire feeding and the wire cutting devices are operated advantageously from the bar 82 through the link 109, in the manner explained. If wooden hoops are desired for the barrel, then the ordinary hoop guides 111 are moved into alignment with the staplers 60 and 61, and it will be understood that the wooden hoop strips are simply fed into these guides by hand.

To change the spacing of the staples on the barrels, the ratio of the sprockets for the chain belt 8 may be changed, by substituting different sprocket wheels in a manner which will be readily understood.

In order to feed the inside hoop 57 into position, the gate or door 22 at the front end of the machine is provided with the opening 112 through which the hoop strip for this hoop 57 can be inserted, as shown in Fig. 8 of the drawings. The attendant simply inserts the end portion of the hoop strip through this opening, behind the guide 113, on the said gate or door, and behind the guide roller 114 thereon, so that the strip is pulled through and guided into place within the end of the barrel as soon as the first staples are driven in the end thereof. In this way, the said inside hoop strip is gradually drawn into the end of the barrel, immediately outside of the bottom head or end wall, while the barrel is rotating, and is progressively fastened in place by the outer member of each of the pairs of staples 63, these staples being clinched on the periphery of the rotary plate 24 in the manner previously explained.

Means are provided for giving the wires for the wire hoops a preliminary feed into position to have their ends secured to the barrel by the first staples driven, and thereafter the feed is automatic. For this purpose a crank handle 115 is provided on the shaft 100, by which to rotate this shaft, after the wires have been cut and the finished barrel has been removed and another barrel has been placed in position. As soon as the fresh ends of the wires are stapled in place, the automatic feeding of the wires by the rotation of the shaft 100 is in synchronism with the rotation of the barrel, as the ratio of the drive through the chain belt 101 is such that the wire feeding rolls serve to feed the wire at the same speed that the barrel rotates, but when the wires are again cut, as previously explained, this power feed of the wires is then interrupted.

In use the machine shown and described is power driven, in any suitable or desired manner, as by a belt on the pulley 116 on the drive shaft 7 previously mentioned. Any suitable means, such as the foot treadle 117, can be employed for controlling the power and starting and stopping the machine at will.

From the foregoing it will be seen that a machine is provided for making barrels of different sizes by relative adjustment of the barrel supports, as previously explained, and at the same time it will be seen that the supporting means which will thus accommodate barrels of different sizes is not complicated or expensive to manufacture. In addition, the barrel support is rotated continuously, instead of intermittently, and this tends to speed up production and eliminate some of the objections to intermittent feed. The staplers are advantageously mounted on curved bracket plates which slide in curved guides, so that the staplers move on the line of a circle, the axis of which is the axis of the barrel, and during such feeding motion of the barrel and action of the staplers only the upper side of the barrel is in engagement with the supporting and feeding means. The barrel set-ups are easily and conveniently placed in the machine, and the finished barrels are easily and quickly removed therefrom.

Thus the barrel support comprising the elements 13, 14, 15, 16, 18, and 19, and the shaft 5, is in effect barrel-shaped in form, but is of less diameter than any barrel that would be made on the machine, whereby said support will accommodate barrels of different sizes. In each case, the barrel is engaged only at its upper side, so that its lower side hangs free of the barrel support, but the latter is entirely rotary and has no portions that are stationary or fixed. The hoop 57 is not fed into an open end of the barrel, but to the contrary is fed into the closed end of the barrel. Also, the hoop 53 may be a permanent hoop, or it may be a temporary hoop, depending upon the method or manner in which the barrel is made. At the rear end of the rotary barrel support, there is a fixed plate 118 secured to the frame of the machine, with an opening 119 therein for the shaft 5, which plate forms an abutment for engaging the open or inner end of the barrel, as shown in Fig. 5 of the drawings. The means for guiding or feeding in the hoop 57 are not on the barrel support, but to the contrary are on the hinged gate 22, as previously explained. It is obvious, of course, that similar hoop guiding or feeding means could be placed on the plate 118, should it be desired to feed an inside hoop into the open end of the barrel.

It will be seen that the machine shown and described is designed for the manufacture of bilge barrels formed of staves assembled and held together by hoops in bilge barrel form. More broadly considered, however, it will be seen that many of the features of the machine shown and described may be used on machinery for the manufacture of receptacles or containers of other shapes or forms.

As a matter of special improvement, it will be observed that springs 120 are provided underneath the shaft 85, one for each rocker arm or walking beam 84, and that set screws 121 are provided for regulating the tension of these springs. The construction is such, it will be seen, that if the materials are of greater thickness, there will be no breakage, inasmuch as the springs 120 will permit the arms or beams 84 to rise on the shaft 85, when the staplers strike the materials, if the pitmen 87 have not quite finished their upward stroke. In this way, the staple drivers of the staplers are yieldingly backed, so to speak, so that the staples are yieldingly driven.

It will also be seen that each rocker arm 84 has an upper set screw 122 that bears against the top of the shaft 85, preferably through the medium of the slide bearing shown, so that the rocker arm can be raised and lowered on the shaft, thereby to accurately adjust the normal position thereof. The springs 120, it will be seen, are preferably supported by hanger brackets 123, which are removably secured to the under side of the rocker arms by the screws 124, whereby the rocker arms can be readily lifted from the transverse overhead shaft 85, by simply removing these bolts, and by disconnecting the pitmen 87 either at their upper or lower ends. Thus in effect a yielding fulcrum is provided for each rocker arm, under the fixed axis formed by the shaft 85, so that the rocker arm itself can give and prevent breakage of the machinery, and prevent crushing of the materials, if the latter are a little thicker than anticipated. The effect, of course, is to yieldingly drive the staples, for in effect the transmission of power through the actuating instrumentalities to the stapler is yielding instead of positive and non-yielding, but the springs 120, of course, are of sufficient stiffness or tension to insure sufficient fulcrum or resistance to properly drive the staples.

In connection with the relative arrangement of the staples 63, those that enter the head 55 being driven in a straight line, with their heads parallel with said line, while those that are driven in the inside hoop 57 being driven obliquely to a straight line, it will be seen, as indicated in Figs. 9 to 16 inclusive, that the said oblique staples are formed by the staple former 65, while the said other staples that are driven in the barrel head are formed by the staple former 64, and for this purpose it will be seen that the former 65 is disposed angularly in relation to the staple former 64, in the manner shown more clearly in Fig. 15 of the drawings. It will also be seen that the former 64 is housed in the main body portion of the casing 72 while the former 65 is housed in the removable section 163 of said casing. The body 72 has a bracket 164 which is supported on the transverse bar 82 of the machine, previously mentioned, as are the other staplers, and in this way the stapler 162 is a multiple staple former and driver, and is adapted to drive two staples at a time, close together, but with the head of one staple of each pair disposed at an angle to the head of the other pair, as shown and described. Thus the heads of the staples 63 that are driven into the hoop 57 are crosswise of the grain of the hoop 54, while the staples that are driven into the head 55 are not crosswise of the grain of the hoop 54, but are crosswise of the grain of the staves 52, and the pairs of staples thus inserted are effective to provide a strong barrel head bottom construction, and the machine that is shown and described is capable of efficient and accurate and relatively high speed production in the manufacture of barrels of the kind shown and described.

Furthermore, it will be seen that the two staple formers 64 and 65 are preferably merged into one integral member 165, so to speak, which latter is wedge-shaped in horizontal cross-section, as shown in Fig. 15 of the drawings. In addition, as shown in Fig. 14 of the drawings, it will be seen that the two converging wires 70 and 80, of which the staples are formed, have their converging ends received in a recess 166 suitably formed in a removable member 167 that is provided to extend vertically at one side of the stapling mechanism, and which is removable from the housing. In this way, a single vertically reciprocating member 165, acting in effect as two staple formers, serves to simultaneously cut off two portions of wire, and to bend the portions into staples of the desired width and length, and the two staples are then driven in the manner shown and described.

What I claim as my invention is:

1. A barrel machine comprising a rotary barrel support having a central longitudinal shaft forming the axis thereof, said support being barrel-shaped in effect but of less diameter than any barrel to be made on said machine, whereby the upper side wall of the barrel will engage said support, while the lower side of the barrel will hang free, with the axis of the barrel and the axis of the rotary support in the same vertical plane, means for rotating said shaft to rotate the barrel support about its horizontal axis, whereby the barrel in turn is rotated about its own axis, means for feeding hoop material onto the outer surface of the rotating barrel, driving means for inserting fasteners successively downward in the upper side of the barrel to secure the hoops in place, and manually controllable instrumentalities associated with said driving means and operable for pressing down on the barrel to keep it in feeding engagement with said barrel support.

2. A structure as specified in claim 1, said instrumentalities comprising movably mounted rollers for engaging the upper side of the barrel, and spring means for yieldingly holding said rollers in engagement with the barrel.

3. A structure as specified in claim 1, said barrel support having a plurality of toothed wheels carried on said shaft to rotate therewith, said wheels engaging the side wall of the barrel, whereby to insure the rotation of the barrel about its own axis, which barrel axis is always below the axis of said barrel supporting shaft.

4. A structure as specified in claim 1, said rotary barrel support being adapted to be inserted in the open end of the barrel, and the outer end of said support having spring-pressed means for yieldingly and frictionally engaging the head of the closed end of the barrel.

5. A structure as specified in claim 1, comprising mechanical provisions for guiding an inside hoop strip into one end of the barrel, while the barrel is rotating about its own longitudinal axis.

6. A structure as specified in claim 1, comprising mechanical provisions for guiding an inside hoop strip into one end of the barrel, while the barrel is rotating about its own longitudinal axis, adapted to direct the inside hoop strip against the head of the closed end of the barrel.

7. A structure as specified in claim 1, comprising means on said barrel support to frictionally engage the head of the closed end of the barrel, and a gate provided with a rotary plate for frictionally engaging the outer side of said barrel head, said rotary plate having its periphery provided with means for clinching staples, said plate rotating about the axis of the barrel support, means for guiding a hoop strip into position between the periphery of said rotary plate and the inner surface of the barrel staves, against the said barrel head, means for guiding an outside hoop strip onto the barrel in the plane of the said inside hoop and barrel head, said fastener driving means comprising a stapler for inserting some staples through said outside hoop and through the barrel staves and into said barrel head, and for inserting other staples through said outside hoop and through the barrel staves and through said inside hoop against the periphery of said rotary plate.

8. A structure as specified in claim 1, comprising means on said barrel support to engage the head of the closed end of the barrel, and a gate provided with a rotary plate for engaging the outer side of said barrel head, said rotary plate having its periphery provided with means for clinching staples, means for guiding a hoop strip into position between the periphery of said rotary plate and the inner surface of the barrel staves, against the said barrel head, means for guiding an outside hoop strip onto the barrel in the plane of the said inside hoop and barrel head, said fastener driving means comprising a stapler for inserting some staples through said outside hoop and through the barrel staves and into said barrel head, and for inserting other staples through said outside hoop and through the barrel staves and through said inside hoop against the periphery of said rotary plate, in combination with means for locking said gate in closed position, manually controllable to unlock the gate when said pressure means are manually released from the exterior of the barrel.

9. A structure as specified in claim 1, said means for exerting external pressure on the barrel comprising rollers for engaging the upper side of the barrel, means whereby said rollers are mounted to move up and down, racks and pinions for raising and lowering the rollers, and a hand lever and spring connections for operating said racks and pinions to thereby cause said rollers to yieldingly engage the barrel while the barrel is rotating, and to release the barrel when the latter is ready to be removed from the machine.

10. A structure as specified in claim 1, said barrel support having annular or peripheral portions for clinching the points of the fasteners.

11. A structure as specified in claim 1, said fastener inserting means comprising a double stapler head adapted to insert some staples through the barrel staves and into the head of the closed end of the barrel, and adapted to insert other staples through the barrel walls and through an inside hoop coiled against the outer surface of said barrel head, together with means for clinching the staples driven through said inside hoop.

12. A structure as specified in claim 1, comprising a stationary abutment for engagement with the inner or open end of the barrel, and a movable abutment for engagement with the head of the closed end of the barrel, whereby the barrel is held against endwise displacement on said rotary support.

13. A structure as specified in claim 1, comprising a stationary abutment for engagement with the inner or open end of the barrel, and a movable abutment for engagement with the head of the closed end of the barrel, whereby the barrel is held against endwise displacement on said rotary support, and manually controllable means for latching said movable abutment in operative position.

14. A structure as specified in claim 1, said hoop material means comprising devices for feeding wire hoops and other devices for guiding flat hoops onto the outer surface of the barrel.

15. A structure as specified in claim 1, said barrel support having means rotating about the axis thereof, to clinch the points of some of the fasteners, together with means external of the barrel and rotating about the axis of said support to clinch the points of other fasteners.

16. A structure as specified in claim 1, said barrel support having a continuous rotary feeding motion, and mechanical provisions whereby the fastener driving means move a distance with the barrel during the actual insertion of the fasteners, and then move back to normal position, this movement of the fastener inserting means being on the line of a circle.

17. A structure as specified in claim 1, said barrel support having a continuous rotary feeding motion, and said fastener driving means comprising staplers, curved supports for said staplers, curved guiding means for said curved supports, means for reciprocating said curved supports about the axis of the barrel and thereby moving said staplers on the line of a circle, whereby the staplers move a distance with the barrel during the actual insertion of the staples, and means for operating said staplers.

18. A structure as specified in claim 1, said barrel support having a continuous rotary feeding motion, and said fastener driving means comprising staplers, curved supports for said staplers, curved guiding means for said curved supports, means for reciprocating said curved supports about the axis of the barrel and thereby moving said staplers on the line of a circle, whereby the staplers move a distance with the barrel during the actual insertion of the staples, and means for operating said staplers, said means for operating the staplers comprising pivoted walking beams having their ends connected by links to the staplers, and actuating means connected to the other ends of said walking beams.

19. A structure as specified in claim 1, said barrel support having a continuous rotary feeding motion, and said fastener driving means comprising staplers, curved supports for said staplers, curved guiding means for said curved supports, means for reciprocating said curved supports about the axis of the barrel and thereby moving said staplers on the line of a circle, whereby the staplers move a distance with the barrel during the actual insertion of the staples, and means for operating said staplers, mechanism on said curved supports to feed wire to the staplers, and ratchet devices actuated by the reciprocation of said curved supports to actuate said wire feeding means.

20. A structure as specified in claim 1, said barrel support having means adjustable axially on the shaft thereof to clinch the staples of barrels of different lengths.

21. In a barrel machine, in combination with means for rotatably supporting the barrel, a double stapler head movable a distance to insert some staples through the walls of the moving barrel and into the head of the closed end thereof, and operative at the same time to insert other staples through the walls of the barrel and through an inside hoop coiled against the outer surface of the barrel head.

22. A structure as specified in claim 21, in combination with a rotary member having its periphery adapted to engage said inside hoop to clinch the staples thereof, while the barrel is moving, and a movable support for said rotary member.

23. A structure as specified in claim 21, said double stapler head being adapted to insert two staples at a time, in pairs, with the heads of the staples of each pair disposed at an angle to each other.

24. A structure as specified in claim 21, said support means having means for guiding said inside hoop into position during the rotation of the barrel.

25. In a barrel machine, the combination of means forming a rotary support for rotatably supporting the barrel, means for inserting fasteners into the barrel, a movable gate adapted to be moved into position against the closed or headed end of the barrel, and means rotatable on said gate about the axis of said rotary barrel support by the rotation of the latter, for clinching the points of said fasteners.

26. In a barrel machine, means for rotatably supporting the barrel, a gate adapted to be moved into position against the closed or headed end of the barrel, said gate having an opening therein to permit the insertion of a hoop strip within the closed end of the barrel, against the head of the barrel, and said gate being provided with a roller for crowding the hoop strip against the barrel head, together with means for inserting fasteners through the barrel walls and into said hoop, whereby after the end of the hoop strip is fastened to the barrel it is then drawn through said opening and coiled into hoop form by the rotation of the barrel.

27. In a barrel machine, the combination of rotary means extending within the barrel for rotatably supporting the barrel about a fixed axis, with the lower side of the barrel hanging free, a gate adapted to be moved into position against the closed or headed end of the barrel, and rotary guiding means on said gate to engage the outside rim of the headed end of the barrel, thereby to guide the rotation of the barrel about a fixed horizontal axis below and in the vertical plane of the axis of said rotary means.

28. In a barrel machine, the combination of a rotary barrel support extending within the barrel and of less diameter than any barrel to be supported thereon, having a horizontal fixed axis, whereby the upper side of the rotating barrel continuously engages the upper side of said support, while the lower side of the barrel hangs free, said support having a central longitudinal shaft forming the fixed supporting axis thereof, means for rotating said shaft to rotate the barrel about its own fixed axis, whereby the two axes are always in the same vertical plane during the rotation of the barrel, and means for performing operations on the barrel during the rotation thereof.

29. In a barrel machine, means for rotatably supporting the barrel with a head in one end thereof, extending within the barrel through its open other end, means for feeding wire hoops to the barrel, means for stapling the wires to the barrel, and means for automatically severing the wires and stopping the feeding of the latter when the hoops are finally secured to the barrel.

30. In a machine for making receptacles, means for rotatably supporting the receptacle, a stapler for performing successive stapling operations on the receptacle, means for causing the receptacle to have a continuous rotary feeding motion, a curved support for said stapler, whereby the stapler is movable a distance with the receptacle, during the actual insertion of the staples, curved guiding means for said curved support, means for reciprocating said curved support, and instrumentalities for operating the stapler.

31. A structure as specified in claim 30, said instrumentalities comprising a pivoted walking beam link connected at one end with the stapler, and actuating means connected to the other end of said walking beam.

32. A structure as specified in claim 30, comprising means carried on said curved support for feeding wire to the stapler, and ratchet means operated by the reciprocation of said curved support to intermittently actuate said wire feeding means.

33. A structure as specified in claim 30, the receptacle supporting means comprising a barrel support of less diameter than any barrel to be supported thereon, having a central longitudinal shaft forming the supporting axis thereof, whereby the upper portion of the barrel engages the upper side of said support, while the lower side of the barrel hangs free.

34. A machine for making receptacles having wire hoops, comprising means for rotatably supporting the receptacle, means for automatically feeding the hoop wire onto the rotating receptacle, means for inserting fasteners to secure the hoops in place, means rotating within and continuously engaging the barrel to support the same and clinch the inner ends of the staples, and cutting means for automatically severing and stopping the feeding of the wire when each hoop is finally secured in place on the receptacle.

35. A structure as specified in claim 34, said cutting means comprising cutters and a cutter actuating rod movable endwise transversely of the machine.

36. In a barrel machine, the combination of a rotary support for supporting an assembly of barrel staves in bilge barrel form, means for causing the bilge barrel to have a continuous rotary feeding motion, by continuous rotation of said rotary support, about an axis below and in the vertical plane of said rotary support, stapling mechanism disposed in position to insert staples in the bilge barrel, means for reciprocating said stapling mechanism on the line of a circle, about the axis of the barrel, whereby said mechanism moves a distance with the barrel while the staples are actually being inserted, and then moves back to normal position, and means for actuating said stapling mechanism to successively insert the staples.

37. A structure as specified in claim 36, said mechanism comprising a stapler for inserting staples through the barrel staves and into the head of the closed end of the barrel.

38. A structure as specified in claim 36, said mechanism comprising a stapler for inserting staples through the barrel staves and into the head of the closed end of the barrel, and including a stapler for securing an inside hoop in place against the outer surface of the barrel head.

39. A structure as specified in claim 36, said mechanism comprising a stapler for inserting staples through the barrel staves and into the head of the closed end of the barrel, and including a stapler for securing an inside hoop in place against the outer surface of the barrel head, together with means operative about the axis of said rotary support to engage the inner and outer surfaces of the barrel head, and to clinch the staples inserted through said inside hoop.

40. A structure as specified in claim 36, comprising pressure rollers disposed in position to bear against the rotating barrel at points adjacent to the stapling mechanism, to maintain the barrel in engagement with said rotary support, and means whereby said pressure rollers are supported to move back and forth with said stapling mechanism.

41. A machine for making receptacles, comprising a rotary support for the receptacle, means for causing continuous rotation of said support, thereby to give the receptacle a continuous rotary feeding motion, stapling mechanism movable back and forth over the surface of the receptacle, whereby said mechanism moves forward a distance with the receptacle during the actual insertion of the staples, and then moves back to normal position, a pressure roller disposed in position to bear against the outer surface of the receptacle, thereby to maintain the receptacle in proper engagement with said rotary support, and means for supporting said roller for movement back and forth with said stapling mechanism.

42. In a machine for making receptacles, a rotary support for the receptacle, a plurality of rollers for engaging the outer surface of the receptacle, while the latter is rotating about an axis below and in the vertical plane of the axis of the rotary support, and means for stapling the materials of the receptacle together while maintained in definite barrel shape about said lower axis, whereby the successive receptacles will be uniform in shape.

43. In a stapling machine, the combination of means for holding the materials to be stapled, stapling mechanism for forming and inserting staples in the materials, and actuating instrumentalities for said stapler, having spring means applied to a fixed axis thereof to permit a yielding action between the stapler and said instrumentalities when the staple driver engages the materials before movement of said instrumentalities is completed.

44. A structure as specified in claim 43, said instrumentalities comprising a rocker arm or walking beam connected at one end to the stapler, and provided with power-operated actuating means at its other end, said spring means comprising one or more springs applied at the fulcrum point of said rocker arm or walking beam, whereby the latter may continue to move a distance after the driving motion of the stapler has ceased.

45. A structure as specified in claim 43, said instrumentalities including a rocker arm or walking beam, said rocker arm having a transverse shaft whereon it is mounted, forming said fixed axis, with said spring means disposed below said shaft on the under side of said rocker arm or walking beam, whereby the latter may rise relatively to the shaft.

46. A structure as specified in claim 43, said instrumentalities including a rocker arm or walking beam, said rocker arm having a transverse shaft whereon it is mounted, forming said fixed axis, with said spring means disposed below said shaft on the under side of said rocker arm or walking beam, whereby the latter may rise relatively to the shaft, and a set screw at the lower end of said spring to regulate the tension thereof.

47. A structure as specified in claim 43, said instrumentalities including a rocker arm or walking beam, said rocker arm having a transverse shaft whereon it is mounted, forming said axis, with said spring means disposed below said shaft on the under side of said rocker arm or walking beam, whereby the latter may rise relatively to the shaft, and a set screw bearing against the top of said shaft in said rocker arm or walking beam, adjustable to change the normal position of the rocker arm on said shaft.

48. In stapling machinery, the combination of means for supporting the materials to be stapled, stapling mechanism supported in position to operate on said materials, power-operated actuating instrumentalities for operating said mechanism, and yielding means applied at a fulcrum point having a fixed axis intermediate the source of power and said mechanism to compensate for different thicknesses of said materials, whereby staples are in effect yieldingly driven.

49. A structure as specified in claim 48, said yielding means comprising a spring providing a yielding fulcrum under said axis for a lever member of said instrumentalities.

50. A barrel machine comprising a rotary barrel support having a central longitudinal shaft forming the axis thereof, said support being barrel-shaped in effect but of less diameter than any barrel to be made on said machine, whereby the upper side wall of the barrel will engage and be supported upon said support at points in the vertical plane of the axis of the barrel, while the lower side of the barrel will hang free, means for rotating said shaft to rotate the barrel support about its horizontal axis, whereby the barrel in turn is rotated about its own axis, means for feeding hoop material onto the outer surface of the rotating barrel, means for inserting fasteners to secure the hoops in place, and manually controllable instrumentalities for pressing down on the barrel to keep it in feeding engagement with said barrel support, comprising mechanical provisions for guiding an inside hoop strip into one end of the barrel, while the barrel is rotating about its own longitudinal axis, adapted to direct the inside hoop strip against the head of the closed end of the barrel.

51. A barrel machine comprising a rotary barrel support having a central longitudinal shaft forming the axis thereof, said support being barrel-shaped in effect but of less diameter than any barrel to be made on said machine, whereby the upper side wall of the barrel will engage and be supported upon said support at points in the vertical plane of the axis of the barrel, while the lower side of the barrel will hang free, means for rotating said shaft to rotate the barrel support about its horizontal axis, whereby the barrel in turn is rotated about its own axis, means for feeding hoop material onto the outer surface of the rotating barrel, means for inserting fasteners to secure the hoops in place, and manually controllable instrumentalities for pressing down on the barrel to keep it in feeding engagement with said barrel support, comprising means on said barrel support to engage the head of the closed end of the barrel, and a gate provided with a rotary member for engaging the outer side of said barrel head, said rotary plate having its periphery provided with means for clinching staples, means for guiding a hoop strip into position between the periphery of said rotary plate and the inner surface of the barrel staves, against the said barrel head, means for guiding an outside hoop strip onto the barrel in the plane of the said inside hoop and barrel head, said fastener driving means comprising a stapler for inserting some staples through said outside hoop and through the barrel staves and into said barrel head, and for inserting other staples through said outside hoop and through the barrel staves and through said inside hoop against the periphery of said rotary plate.

52. A barrel machine comprising a rotary barrel support having a central longitudinal shaft forming the axis thereof, said support being barrel-shaped in effect but of less diameter than any barrel to be made on said machine, whereby the upper side wall of the barrel will engage and be supported upon said support at points in the vertical plane of the axis of the barrel, while the lower side of the barrel will hang free, means for rotating said shaft to rotate the barrel support about its horizontal axis, whereby the barrel in turn is rotated about its own axis, means for feeding hoop material onto the outer surface of the rotating barrel, means for inserting fasteners to secure the hoops in place, and manually controllable instrumentalities for pressing down on the barrel to keep it in feeding engagement with said barrel support, comprising means on said barrel support to engage the head of the closed end of the barrel, and a gate provided with a rotary plate for engaging the outer side of said barrel head, said rotary plate having its periphery provided with means for clinching staples, means for guiding a hoop strip into position between the periphery of said rotary plate and the inner surface of the barrel staves, against the said barrel head, means for guiding an outside hoop strip onto the barrel in the plane of the said inside hoop and barrel head, said fastener driving means comprising a stapler for inserting some staples through said outside hoop and through the barrel staves and into said barrel head, and for inserting other staples through said outside hoop and through the barrel staves and through said inside hoop against the periphery of said rotary plate, in combination with means for locking said gate in closed position, manually controllable to unlock the gate when said pressure means are manually released from the exterior of the barrel.

53. A barrel machine comprising a rotary barrel support having a central longitudinal shaft forming the axis thereof, said support being barrel-shaped in effect but of less diameter than any barrel to be made on said machine, whereby the upper side wall of the barrel will engage and be supported upon said support at points in the vertical plane of the axis of the barrel while the lower side of the barrel will hang free, means for rotating said shaft to rotate the barrel support about its horizontal axis, whereby the barrel in turn is rotated about its own axis, means for feeding hoop material onto the outer surface of the rotating barrel, means for inserting fasteners to secure the hoops in place, and manually controllable instrumentalities for pressing down on the barrel to keep it in feeding engagement with said barrel support, said means for exerting external pressure on the barrel comprising rollers for engaging the upper side of the barrel, means whereby said rollers are mounted to move up and down, racks and pinions for raising and lowering the rollers, and a hand lever and spring connections for operating said racks and pinions to thereby cause said rollers to yieldingly engage the barrel while the barrel is rotating, and to release the barrel when the latter is ready to be removed from the machine.

54. A barrel machine comprising a rotary barrel support having a central longitudinal shaft forming the axis thereof, said support being barrel-shaped in effect but of less diameter than any barrel to be made on said machine, whereby the upper side wall of the barrel will engage said support, while the lower side of the barrel will hang free, means for rotating said shaft to rotate the barrel support about its horizontal axis, whereby the barrel in turn is rotated about its own axis, means for feeding hoop material onto the outer surface of the rotating barrel, means for inserting fasteners to secure the hoops in place, and manually controllable instrumentalities for pressing down on the barrel to keep it in feeding engagement with said barrel support, said barrel support having annular or peripheral portions for clinching the points of the fasteners.

55. A barrel machine comprising a rotary barrel support having a central longitudinal shaft forming the axis thereof, said support being barrel-shaped in effect but of less diameter than any barrel to be made on said machine, whereby the upper side wall of the barrel will engage and be supported upon said support at points in the vertical plane of the axis of the barrel, while the lower side of the barrel will hang free, means for rotating said shaft to rotate the barrel support about its horizontal axis, whereby the barrel in turn is rotated about its own axis, means for feeding hoop material onto the outer surface of the rotating barrel, means for inserting fasteners to secure the hoops in place, and manually controllable instrumentalities for pressing down on the barrel to keep it in feeding engagement with said barrel support, said fastener inserting means comprising a double stapler head adapted to insert some staples through the barrel staves and into the head of the closed end of the barrel, and adapted to insert other staples through the barrel walls and through an inside hoop coiled against the outer surface of said barrel head, together with means for clinching the staples driven through said inside hoop.

56. A barrel machine comprising a rotary barrel support having a central longitudinal shaft forming the axis thereof, said support being barrel-shaped in effect but of less diameter than any barrel to be made on said machine, whereby the upper side wall of the barrel will engage and be supported upon said support at points in the vertical plane of the axis of the barrel, while the lower side of the barrel will hang free, means for rotating said shaft to rotate the barrel support about its horizontal axis, whereby the barrel in turn is rotated about its own axis, means for feeding hoop material onto the outer surface of the rotating barrel, means for inserting fasteners to secure the hoops in place, and manually controllable instrumentalities for pressing down on the barrel to keep it in feeding engagement with said barrel support, comprising a stationary abutment for engagement with the inner or open end of the barrel, and a movable abutment for engagement with the head of the closed end of the barrel, whereby the barrel is held against endwise displacement on said rotary support.

57. A barrel machine comprising a rotary barrel support having a central longitudinal shaft forming the axis thereof, said support being barrel-shaped in effect but of less diameter than any barrel to be made on said machine, whereby the upper side wall of the barrel will engage and be supported upon said support at points in the vertical plane of the axis of the barrel, while the lower side of the barrel will hang free, means for rotating said shaft to rotate the barrel support about its horizontal axis, whereby the barrel in turn is rotated about its own axis, means for feeding hoop material onto the outer surface of the rotating barrel, means for inserting fasteners to secure the hoops in place, and manually controllable instrumentalities for pressing down on the barrel to keep it in feeding engagement with said barrel support, comprising a stationary abutment for engagement with the inner or open end of the barrel, and a movable abutment for engagement with the head of the closed end of the barrel, whereby the barrel is held against endwise displacement on said rotary support, and manually controllable means for latching said movable abutment in operative position.

58. A barrel machine comprising a rotary barrel support having a central longitudinal shaft forming the axis thereof, said support being barrel-shaped in effect but of less diameter than any barrel to be made on said machine, whereby the upper side wall of the barrel will engage said support, while the lower side of the barrel will hang free, means for rotating said shaft to rotate the barrel support about its horizontal axis, whereby the barrel in turn is rotated about its own axis, means for feeding hoop material onto the outer surface of the rotating barrel, means for inserting fasteners to secure the hoops in place, and manually controllable instrumentalities for pressing down on the barrel to keep it in feeding engagement with said barrel support, said barrel support having means rotating about the axis thereof, to clinch the points of some of the fasteners, together with means external of the barrel and rotating about the axis thereof to clinch the points of other fasteners.

59. A barrel machine comprising a rotary barrel support having a central longitudinal shaft forming the axis thereof, said support being barrel-shaped in effect but of less diameter than any barrel to be made on said machine, whereby the upper side wall of the barrel will engage said support, while the lower side of the barrel will hang free, means for rotating said shaft to rotate the barrel support about its horizontal axis, whereby the barrel in turn is rotated about its own axis, means for feeding hoop material onto the outer surface of the rotating barrel, means for inserting fasteners to secure the hoops in place, and manually controllable instrumentalities for pressing down on the barrel to keep it in feeding engagement with said barrel support, said barrel support having a continuous rotary feeding motion, and mechanical provisions whereby the fastener driving means move a distance with the barrel during the actual insertion of the fasteners, and then move back to normal position, this movement of the fastener inserting means being on the line of a circle.

60. A barrel machine comprising a rotary barrel support having a central longitudinal shaft forming the axis, thereof, said support being barrel shaped in effect but of less diameter than any barrel to be made on said machine, whereby the upper side wall of the barrel will engage said support, while the lower side of the barrel will hang free, means for rotating said shaft to rotate the barrel support about its horizontal axis, whereby the barrel in turn is rotated about its own axis, means for feeding hoop material onto the outer surface of the rotating barrel, means for inserting fasteners to secure the hoops in place, and manually controllable instrumentalities for pressing down on the barrel to keep it in feeding engagement with said barrel support, said barrel support having a continuous rotary feeding motion, and said fastener driving means comprising staplers, curved supports for said staplers, curved guiding means for said curved supports, means for reciprocating said curved supports and thereby moving said staplers on the line of a circle, whereby the staplers move a distance with the barrel during the actual insertion of the staples, and means for operating said staplers.

61. A barrel machine comprising a rotary barrel support having a central longitudinal shaft forming the axis thereof, said support being barrel-shaped in effect but of less diameter than any barrel to be made on said machine, whereby the upper side wall of the barrel will engage said support, while the lower side of the barrel will hang free, means for rotating said shaft to rotate the barrel support about its horizontal axis, whereby the barrel in turn is rotated about its own axis, means for feeding hoop material onto the outer surface of the rotating barrel, means for inserting fasteners to secure the hoops in place, and manually controllable instrumentalities for pressing down on the barrel to keep it in feeding engagement with said barrel support, said barrel support having a continuous rotary feeding motion, and said fastener driving means comprising staplers, curved supports for said staplers, curved guiding means for said curved supports, means for reciprocating said curved supports and thereby moving said staplers on the line of a circle, whereby the staplers move a distance with the barrel during the actual insertion of the staples, and means for operating said staplers, said means for operating the staplers comprising pivoted walking beams having their ends connected by links to the staplers, and actuating means connected to the other ends of said walking beams.

62. A barrel machine comprising a rotary barrel support having a central longitudinal shaft forming the axis thereof, said support being barrel-shaped in effect but of less diameter than any barrel to be made on said machine, whereby the upper side wall of the barrel will engage said support, while the lower side of the barrel will hang free, means for rotating said shaft to rotate the barrel support about its horizontal axis, whereby the barrel in turn is rotated about its own axis, means for feeding hoop material onto the outer surface of the rotating barrel, means for inserting fasteners to secure the hoops in place, and manually controllable instrumentalities for pressing down on the barrel to keep it in feeding engagement with said barrel support, said barrel support having a continuous rotary feeding motion, and said fastener driving means comprising staplers, curved supports for said staplers, curved guiding means for said curved supports, means for reciprocating said curved supports and thereby moving said staplers on the line of a circle, whereby the staplers move a distance with the barrel during the actual insertion of the staples, and means for operating said staplers, mechanism on said curved supports to feed wire to the staplers, and ratchet devices actuated by the reciprocation of said curved supports to actuate said wire feeding means.

63. A machine for making receptacles having wire hoops, comprising means for rotatably supporting the receptacle, means for feeding the hoop wire onto the rotating receptacle, means for inserting fasteners to secure the hoops in place, and cutting means for severing the wire when each hoop is finally secured in place on the receptacle, comprising means automatically operative in the operation of cutting the wire to prevent the further feeding thereof.

64. In a barrel machine, the combination of a rotary support for supporting an assembly of barrel staves in bilge barrel form, means for causing the bilge barrel to have a continuous rotary feeding motion, by continuous rotation of said rotary support, stapling mechanism disposed in position to insert staples in the bilge barrel, means for reciprocating said stapling mechanism on the line of a circle, whereby said mechanism moves a distance with the barrel while the staples are actually being inserted, and then moves back to normal position, and means for actuating said stapling mechanism, said mechanism comprising a stapler for inserting staples through the barrel staves and into the head of the closed end of the barrel, and including a stapler for securing an inside hoop in place against the outer surface of the barrel head.

65. In a barrel machine, the combination of a rotary support for supporting an assembly of barrel staves in bilge barrel form, means for causing the bilge barrel to have a continuous rotary feeding motion, by continuous rotation of said rotary support, stapling mechanism disposed in position to insert staples in the bilge barrel, means for reciprocating said stapling mechanism on the line of a circle, whereby said mechanism moves a distance with the barrel while the staples are actually being inserted, and then moves back to normal position, and means for actuating said stapling mechanism, said mechanism comprising a stapler for inserting staples through the barrel staves and into the head of the closed end of the barrel, and including a stapler for securing an inside hoop in place against the outer surface of the barrel head, together with means operative about the axis of said rotary support to engage the inner and outer surfaces of the barrel head, and to clinch the staples inserted through said inside hoop.

66. In a barrel machine, the combination of a rotary support for supporting an assembly of barrel staves in bilge barrel form, means for causing the bilge barrel to have a continuous rotary feeding motion, by continuous rotation of said rotary support, stapling mechanism disposed in position to insert staples in the bilge barrel, means for reciprocating said stapling mechanism on the line of a circle, whereby said mechanism moves a distance with the barrel while the staples are actually being inserted, and then moves back to normal position, and means for actuating said stapling mechanism, comprising pressure rollers disposed in position to bear against the rotating barrel at points adjacent the stapling mechanism, to maintain the barrel in engagement with said rotary support, and means whereby said pressure rollers are supported to move back and forth with said stapling mechanism.

67. In a stapling machine, the combination of means for holding the materials to be stapled, stapling mechanism for forming and inserting staples in the materials, and actuating instrumentalities for said stapler, having spring means to permit a yielding action between the stapler and said instrumentalities when the staple driver engages the materials before movement of said instrumentalities is completed, said instrumentalities comprising a rocker arm or walking beam connected at one end to the stapler, and provided with power-operated actuating means at its other end, said spring means comprising one or more springs applied at the fulcrum point of said rocker arm or walking beam, whereby the latter may continue to move a distance after the driving motion of the stapler has ceased.

68. In stapling machinery for making barrels having heads and liners therefor, a double stapler movable a distance for simultaneously driving two staples while the barrel is moving rotatively, and means for maintaining the moving barrel in position to receive one staple in the head and the other staple in the liner.

69. In a stapling machine, a double stapler head provided with formers and drivers for forming and driving staples in pairs, having one staple former disposed in position to form staples that are driven in a straight line, with their heads parallel with said line, and having another staple former that is disposed at an angle to form staples that are driven obliquely to a line parallel with said first mentioned line, whereby the head of one staple of each pair is parallel with both lines, while the head of one staple of each pair is oblique to both lines, the formers being disposed between the drivers, means for supporting the work to receive the staples in the manner stated, and means for operating said staple formers in unison.

70. A structure as specified in claim 69, comprising a casing for said head, with a bracket for suitably supporting the head on the machine, said casing having a removable section for housing the angularly disposed staple former and its allotted driver, and forming a guide for the latter.

71. A structure as specified in claim 69, comprising a pivoted anvil or loop bar for each staple former, said staple formers being disposed between the said loop bars.

72. In a stapling machine, stapling mechanism comprising a pair of staple formers disposed at an angle to each other, with the staple drivers arranged with said formers between them, so that the staples driven will have their heads disposed at an angle to each other, means at the outer sides of the drivers to cooperate with said formers to form the staples, means to support the work to receive the staples in the manner stated, and means for operating said mechanism to insert successive pairs of staples, with the heads of successive pairs converging in the same direction.

73. A structure as specified in claim 72, comprising means for feeding two wires convergingly to said staple formers, the latter being united in one integral member, which latter is wedge-shaped in horizontal cross-section.

74. A structure as specified in claim 72, comprising means for feeding two wires convergingly to said staple formers, the latter being united in one integral member, which latter is wedge-shaped in horizontal cross-section, and means forming a recess to receive the converging ends of the two wires, when the latter are fed into position to be cut off and simultaneously formed into a pair of staples.

75. A machine for making receptacles having wire hoops, comprising means for rotatably supporting the receptacle, means for feeding hoop wire onto the rotating receptacle, means for inserting fasteners to secure the hoops in place, means rotating within and continuously engaging the barrel to support the same and clinch the inner ends of the staples, and cutting means for severing the wire when each hoop is finally secured in place on the receptacle, comprising means automatically operative in the operation of cutting the wire to prevent the further feeding thereof.

76. In a barrel machine, the combination of a rotary ring of less diameter than the barrel, to support the barrel for rotation about a horizontal axis below and in the vertical plane of the axis of said ring, teeth on said ring to engage the inner surface of the barrel, and roller means in said plane engaging the outer surface of the barrel to press the side walls downwardly against said teeth, together with means in said plane operating on the barrel at intervals during the rotation thereof, and means for positively rotating said ring.

77. A structure as specified in claim 76, comprising racks and pinions for operating said engaging means up and down, said pinions having parallel axes disposed in a horizontal plane, these axes extending at right angles to the axis of the barrel.

78. In a stapling machine, stapling mechanism comprising a pair of staple formers disposed at an angle to each other, so that the staples driven will have their heads disposed at an angle to each other, means to support the work to receive the staples in the manner stated, and means for operating said mechanism to insert successive pairs of staples, with the heads of successive pairs converging in the same direction, comprising means for feeding two wires convergingly to said staple formers, the latter being united in one integral member, which latter is wedge-shaped in horizontal cross-section.

79. In a stapling machine, stapling mechanism comprising a pair of staple formers disposed at an angle to each other, so that the staples driven will have their heads disposed at an angle to each other, means to support the work to receive the staples in the manner stated, and means for operating said mechanism to insert successive pairs of staples, with the heads of successive pairs converging in the same direction, comprising means for feeding two wires convergingly to said staple formers, the latter being united in one integral member, which latter is wedge-shaped in horizontal cross-section, and means forming a recess to receive the converging ends of the two wires, when the latter are fed into positon to be cut off and simultaneously formed into a pair of staples.

WALTER F. NEWHOUSE.